(12) United States Patent
Cova et al.

(10) Patent No.: US 11,258,640 B2
(45) Date of Patent: Feb. 22, 2022

(54) FEEDBACK CONTROL SYSTEMS FOR WIRELESS DEVICES

(71) Applicant: Intel Corporation, Santa Clara, CA (US)

(72) Inventors: Armando Cova, Chandler, AZ (US); Christoph Hepp, Neubiberg (DE); Gunther Kraut, Egmating (DE); Andreas Langer, Lohhof (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/958,060

(22) PCT Filed: Mar. 30, 2018

(86) PCT No.: PCT/US2018/025403
§ 371 (c)(1),
(2) Date: Jun. 25, 2020

(87) PCT Pub. No.: WO2019/190551
PCT Pub. Date: Oct. 3, 2019

(65) Prior Publication Data
US 2021/0067386 A1 Mar. 4, 2021

(51) Int. Cl.
*H04L 25/03* (2006.01)
*H04L 25/49* (2006.01)
(Continued)

(52) U.S. Cl.
CPC ......... *H04L 25/03343* (2013.01); *H04B 1/04* (2013.01); *H04L 25/49* (2013.01); *H04L 27/3411* (2013.01); *H04B 2001/0408* (2013.01)

(58) Field of Classification Search
CPC .............. H04B 1/04; H04B 2001/0408; H04L 25/03343; H04L 25/49; H04L 27/3411
See application file for complete search history.

(56) References Cited

U.S. PATENT DOCUMENTS 9,154,168 B2    10/2015   Cova
9,337,782 B1 *  5/2016    Mauer ..................... H03F 3/245
(Continued)

FOREIGN PATENT DOCUMENTS

WO    WO-2019190551 A1    10/2019

OTHER PUBLICATIONS

"International Application Serial No. PCT/US2018/025403, International Search Report dated Dec. 28, 2018", 3 pgs.
(Continued)

*Primary Examiner* — David S Huang
(74) *Attorney, Agent, or Firm* — Schwegman Lundberg & Woessner, P.A.

(57) ABSTRACT

An apparatus for a mobile communication device adapted for digital pre-distortion that includes a memory and a processor operatively coupled to the memory of the processor. The processor receives a first input signal and also receives a first output signal from a power amplifier that is based on the first input signal. The processor additionally varies compression applied to a second input signal based on the first output signal of the power amplifier, generates a distortion compensation vector for the second input signal based on the first output signal of the power amplifier, and also varies an input excitation signal supplied to the power amplifier based on the first output signal of the power amplifier.

14 Claims, 21 Drawing Sheets

(51) Int. Cl.
*H04B 1/04* (2006.01)
*H04L 27/34* (2006.01)

(56) References Cited

U.S. PATENT DOCUMENTS

| | | |
|---|---|---|
| 9,787,336 B1 | 10/2017 | Cova |
| 2010/0130145 A1 | 5/2010 | Jang |
| 2013/0072139 A1 | 3/2013 | Kang et al. |
| 2013/0257529 A1* | 10/2013 | Komninakis ............ H03F 3/24 330/149 |
| 2014/0219392 A1 | 8/2014 | Chen et al. |
| 2015/0099564 A1 | 4/2015 | Shih |
| 2016/0087657 A1 | 3/2016 | Yu et al. |

OTHER PUBLICATIONS

"International Application Serial No. PCT/US2018/025403, Written Opinion dated Dec. 28, 2018", 11 pgs.
"International Application Serial No. PCT/US2018/025403, International Preliminary Report on Patentability dated Oct. 15, 2020", 13 pgs.

* cited by examiner

FEEDBACK CONTROL SYSTEMS FOR WIRELESS DEVICES

CROSS-REFERENCE TO RELATED APPLICATION

This application is a U.S. National Stage Filing under 35 U.S.C. 371 from International Application No. PCT/US2018/025403, filed on 30 Mar. 2018, and published as WO 2019/19055 A1 on 3 Oct. 2019, which application is incorporated herein by reference in its entirety.

TECHNICAL FIELD

The present disclosure pertains generally, but not by way of limitation, to user communication devices such as phones. More specifically, aspects of the present disclosure pertain to transmit circuitry for processing an input signal. Other aspects of the disclosure relate to feedback control systems for wireless devices.

BACKGROUND

Communication devices may exchange various signals with other devices, such as data signals, control signals or other signals. As an example, a baseband (BB) signal may be up-converted to a radio frequency (RF) range for input to a power amplifier (PA). In some cases, one or more components of an input path may operate on the baseband signal before it is input to the PA. In some cases, the PA and/or component(s) of the input path may cause one or more types of distortion, including in-phase/quadrature (IQ) distortion, memory distortion, and/or other types of distortion. Such distortion may potentially cause issues, such as splatter into frequency bands adjacent to the RF channel, passband ripple, and/or other issues, which may degrade performance of the devices. Accordingly, there is a need for devices and components to reduce and/or control such distortion in these and other scenarios.

To address these distortions, often significant current consumption is required, draining battery life. In sum, a balance between reducing current consumption for increased battery life and maintaining linearity of the signal can be helpful in meeting industry standards. Digital pre-distortion is used to mitigate the increase of PA current consumption. By appropriate predistortion of the PA input signal, less PA headroom and PA quiescent current can be used, while maintaining sufficient linearity, e.g., meeting adjacent channel leakage ratio (ACLR), transmit spectral mask, and error vector magnitude (EVM) targets. However, increased transmit bandwidth increases the complexity of the pre-distorter because the linearity characteristic of the transmit chain depends on the instantaneous RF frequency and how fast the envelope of modulated RF signal changes. Subsequently, the linearity characteristic depends on the IQ data stream which modulates the RF carrier. The amplitude modulation to amplitude modulation (AMAM) and amplitude modulation to phase modulation (AMPM) response is no longer constant and depends on the sequence of modulation symbols. This can be referred to as a "memory effect" or "memory disturbance," and can be more pronounced at higher transmit bandwidth. While doing so in different manners, both average power tracking (APT) and envelope tracking (ET) systems produce memory disturbance. Thus, as communication devices intake more complex signals with increased aggregated bandwidth, signal processing techniques can be used to accommodate these signal without performance losses.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various aspects discussed in the present disclosure.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
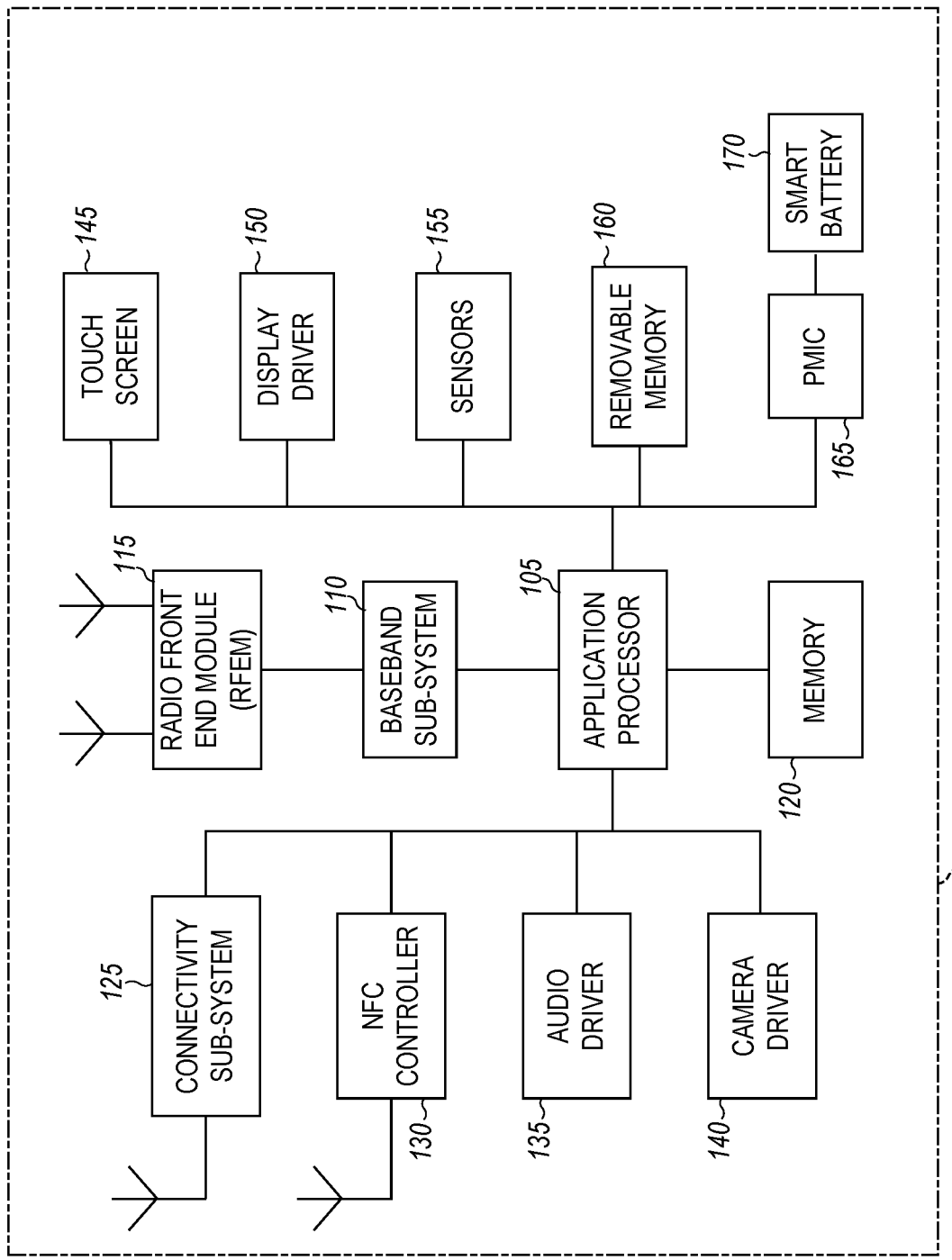
FIG. 1 illustrates an exemplary user device according to some aspects.

FIG. 1 illustrates an exemplary user device according to some aspects. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165, and smart battery 170.

In some aspects, application processor 105 may include, for example, one or more central processing unit (CPU) cores and one or more of cache memory, low drop-out voltage regulators (LDOs), interrupt controllers, serial interfaces such as SPI, I2C or universal programmable serial interface sub-system, real time clock (RTC), timer-counters including interval and watchdog timers, general purpose IO, memory card controllers such as SD/MMC or similar, USB interfaces, MIPI interfaces, and/or Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module including two or more integrated circuits.

Applications of mmWave technology can include, for example, WiGig and future 5G, but the mmWave technology can be applicable to a variety of telecommunications systems. The mmWave technology can be especially attractive for short-range telecommunications systems. WiGig devices operate in the unlicensed 60 GHz band, whereas 5G mmWave is expected to operate initially in the licensed 28 GHz and 39 GHz bands. A block diagram of an example baseband sub-system 110 and RFEM 115 in a mmWave system is shown in FIG. 1A.

Figure 1A:
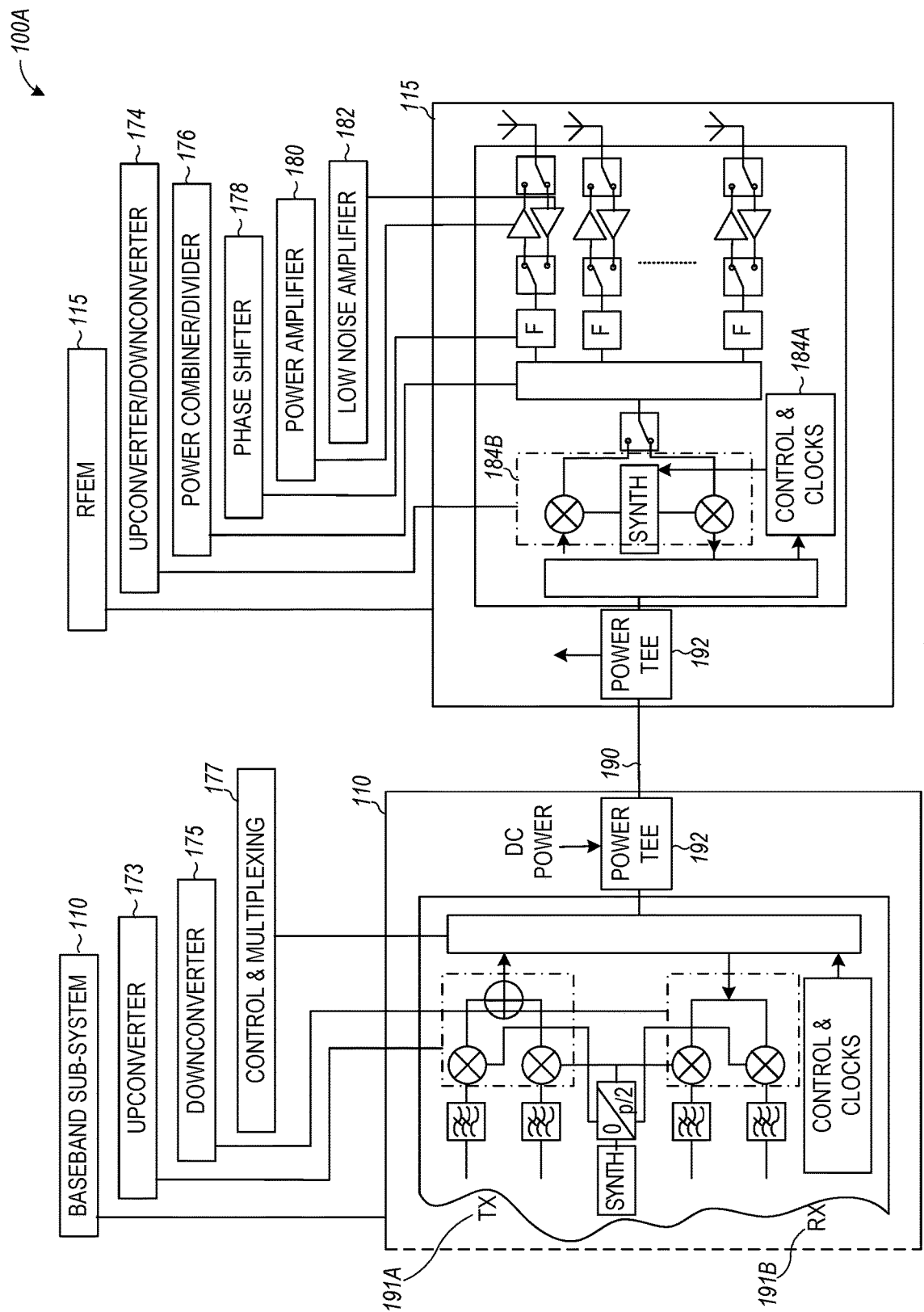
FIG. 1A illustrates a mmWave system, which can be used in connection with the device of FIG. 1 according to some aspects.

FIG. 1A illustrates a mmWave system 100A, which can be used in connection with the device 100 of FIG. 1 according to some aspects of the present disclosure. The system 100A includes two components: a baseband sub-system 110 and one or more radio front end modules (RFEMs) 115. The RFEM 115 can be connected to the baseband sub-system 110 by a single coaxial cable 190, which supplies a modulated intermediate frequency (IF) signal, DC power, clocking signals and control signals.

The baseband sub-system 110 is not shown in its entirety, but FIG. 1A rather shows an implementation of analog front end. This includes a transmitter (TX) section 191A with an upconverter 173 to intermediate frequency (IF) (around 10 GHz in current implementations), a receiver (RX) section 191B with downconversion 175 from IF to baseband, control and multiplexing circuitry 177 including a combiner to multiplex/demultiplex transmit and receive signals onto a single cable 190. In addition, power tee circuitry 192 (which includes discrete components) is included on the baseband circuit board to provide DC power for the RFEM 115. In some aspects, the combination of the TX section and RX section may be referred to as a transceiver, to which may be coupled one or more antennas or antenna arrays of the types described herein.

The RFEM 115 can be a small circuit board including a number of printed antennas and one or more RF devices containing multiple radio chains, including upconversion/downconversion 174 to millimeter wave frequencies, power combiner/divider 176, programmable phase shifting 178 and power amplifiers (PA) 180, low noise amplifiers (LNA) 182, as well as control and power management circuitry 184A and 184B. This arrangement can be different from Wi-Fi or cellular implementations, which generally have all RF and baseband functionality integrated into a single unit and only antennas connected remotely via coaxial cables.

This architectural difference can be driven by the very large power losses in coaxial cables at millimeter wave frequencies. These power losses can reduce the transmit power at the antenna and reduce receive sensitivity. In order to avoid this issue, in some aspects, PAs 180 and LNAs 182 may be moved to the RFEM 115 with integrated antennas. In addition, the RFEM 115 may include upconversion/downconversion 174 so that the IF signals over the coaxial cable 190 can be at a lower frequency. Additional system context for mmWave 5G apparatuses, techniques and features is discussed herein below.

Figure 2:
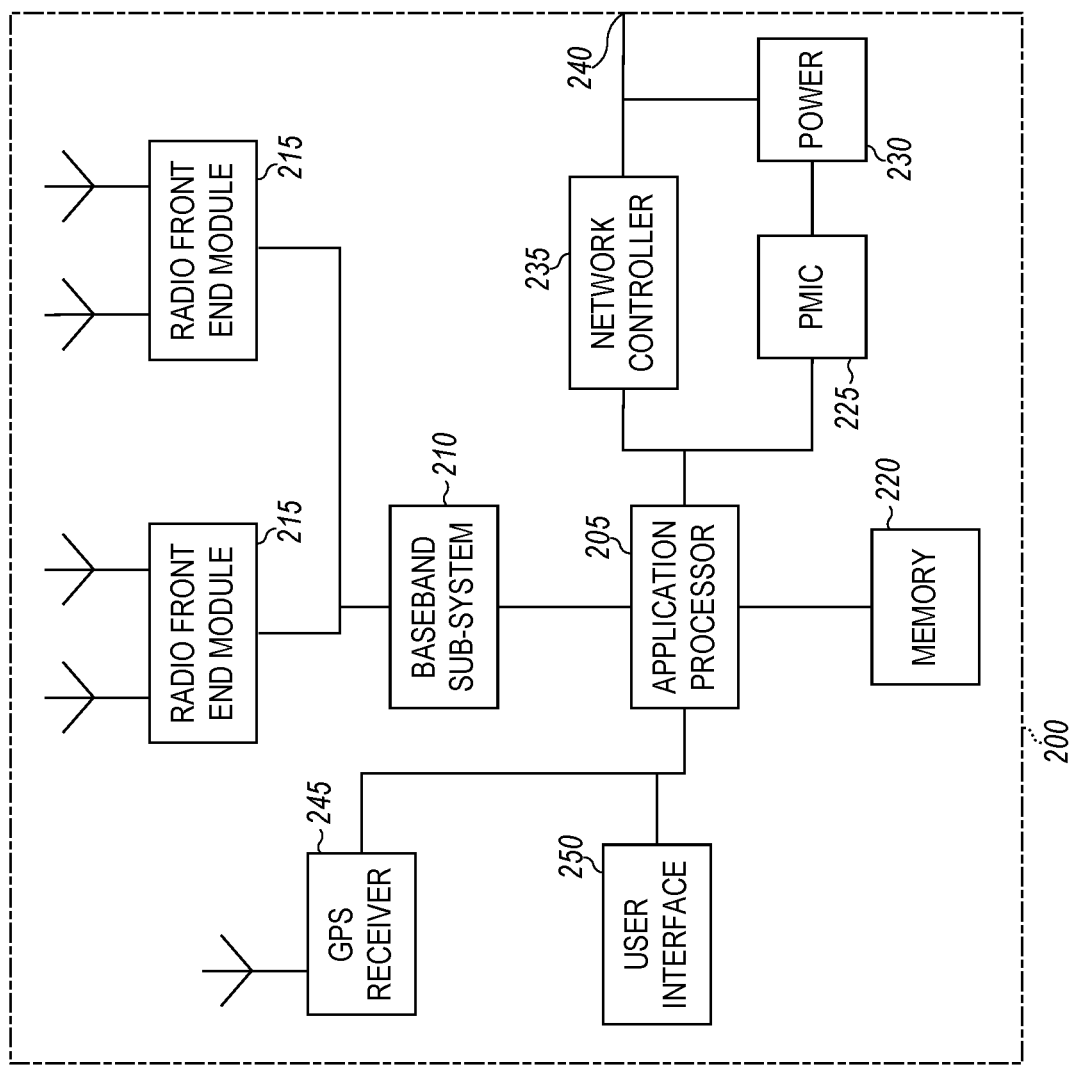
FIG. 2 illustrates an exemplary base station radio head according to some aspects.

FIG. 2 illustrates an exemplary base station or infrastructure equipment radio head according to some aspects. The base station radio head 200 may include one or more of application processor 205, baseband processors 210, one or more radio front end modules 215, memory 220, power management integrated circuitry (PMIC) 225, power tee circuitry 230, network controller 235, network interface connector 240, satellite navigation receiver (e.g., GPS receiver) 245, and user interface 250.

In some aspects, application processor 205 may include one or more CPU cores and one or more of cache memory, low drop-out voltage regulators (LDOs), interrupt controllers, serial interfaces such as SPI, I$^2$C or universal programmable serial interface, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip sub-system including two or more integrated circuits.

In some aspects, memory 220 may include one or more of volatile memory including dynamic random access memory (DRAM) and/or synchronous DRAM (SDRAM), and non-volatile memory (NVM) including high-speed electrically erasable memory (commonly referred to as Flash memory), phase-change random access memory (PRAM), magnetoresistive random access memory (MRAM), and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable. Power tee circuitry 230 may provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide, to application processor 205, data which may include one or more of position data or time data. Time data may be used by application processor 205 to synchronize operations with other radio base stations or infrastructure equipment.

In some aspects, user interface 250 may include one or more of buttons. The buttons may include a reset button. User interface 250 may also include one or more indicators such as LEDs and a display screen.

Figure 3A:
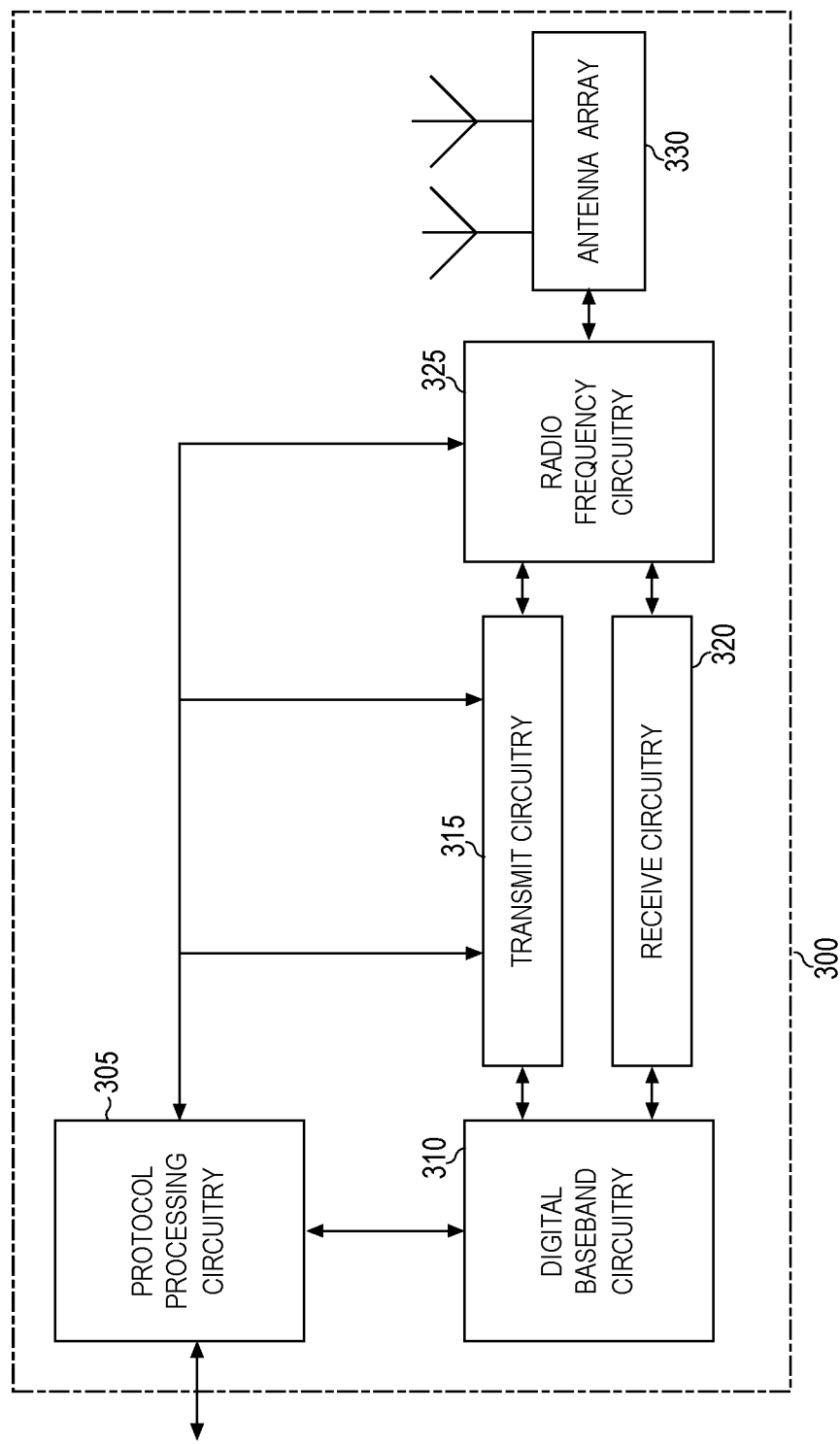
FIG. 3A illustrates exemplary millimeter wave communication circuitry according to some aspects.
Figure 3B:
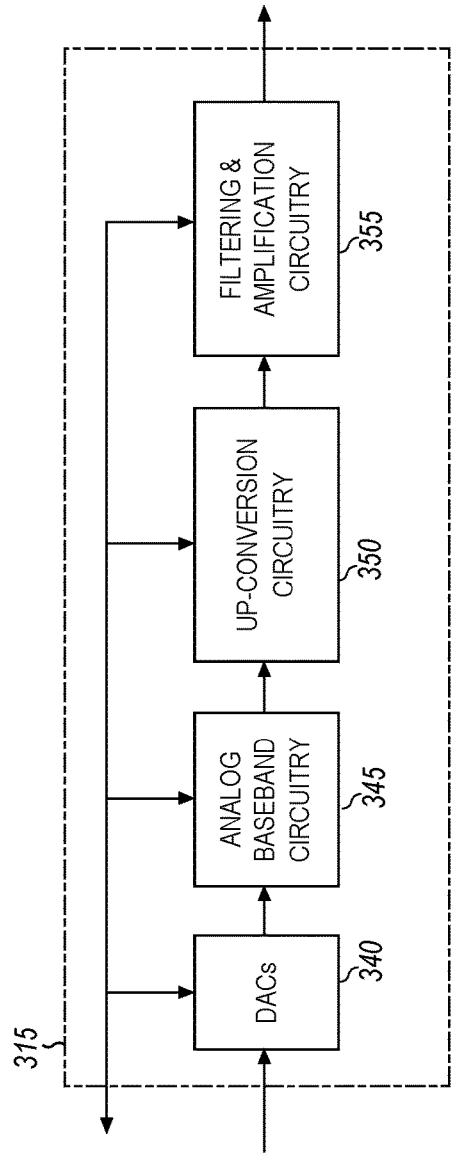
FIG. 3B illustrates aspects of exemplary transmit circuitry illustrated in FIG. 3A according to some aspects.
Figure 3C:
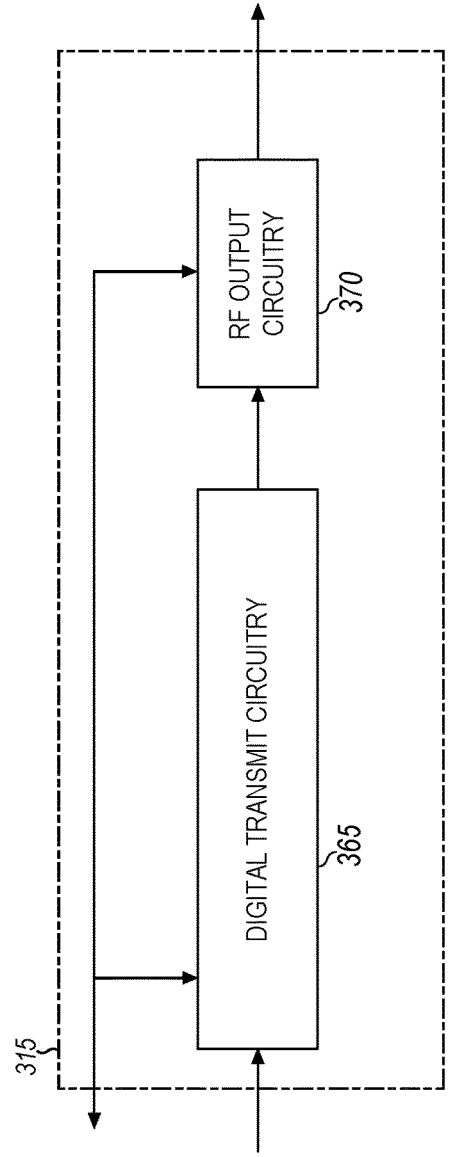
FIG. 3C illustrates aspects of exemplary transmit circuitry illustrated in FIG. 3A according to some aspects.

FIG. 3A illustrates exemplary mmWave communication circuitry according to some aspects; FIGS. 3B and 3C illustrate aspects of transmit circuitry shown in FIG. 3A according to some aspects. Millimeter wave communication circuitry 300 shown in FIG. 3A may be alternatively grouped according to functions. Components illustrated in FIG. 3A are provided here for illustrative purposes and may include other components not shown in FIG. 3A.

Millimeter wave communication circuitry 300 may include protocol processing circuitry 305 (or processor) or other means for processing. Protocol processing circuitry 305 may implement one or more of medium access control (MAC), radio link control (RLC), packet data convergence protocol (PDCP), radio resource control (RRC) and non-access stratum (NAS) functions, among others. Protocol processing circuitry 305 may include one or more processing cores to execute instructions and one or more memory structures to store program and data information.

Millimeter wave communication circuitry 300 may further include digital baseband circuitry 310. Digital baseband circuitry 310 may implement physical layer (PHY) functions including one or more of hybrid automatic repeat request (HARD) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330. Millimeter wave communication circuitry 300 may further include RF circuitry 325. In some aspects, RF circuitry 325 may include one or multiple parallel RF chains for transmission and/or reception. Each of the RF chains may be connected to one or more antennas of antenna array circuitry 330.

In some aspects, protocol processing circuitry 305 may include one or more instances of control circuitry. The control circuitry may provide control functions for one or more of digital baseband circuitry 310, transmit circuitry 315, receive circuitry 320, and/or RF circuitry 325.

FIGS. 3B and 3C illustrate aspects of transmit circuitry shown in FIG. 3A according to some aspects. Transmit circuitry 315 shown in FIG. 3B may include one or more of digital to analog converters (DACs) 340, analog baseband circuitry 345, up-conversion circuitry 350 and/or filtering and amplification circuitry 355. DACs 340 may convert digital signals into analog signals. Analog baseband circuitry 345 may perform multiple functions as indicated below. Up-conversion circuitry 350 may up-convert baseband signals from analog baseband circuitry 345 to RF frequencies (e.g., mmWave frequencies). Filtering and amplification circuitry 355 may filter and amplify analog signals. Control signals may be supplied between protocol processing circuitry 305 and one or more of DACs 340, analog baseband circuitry 345, up-conversion circuitry 350 and/or filtering and amplification circuitry 355.

Transmit circuitry 315 shown in FIG. 3C may include digital transmit circuitry 365 and RF circuitry 370. In some aspects, signals from filtering and amplification circuitry 355 may be provided to digital transmit circuitry 365. As above, control signals may be supplied between protocol processing circuitry 305 and one or more of digital transmit circuitry 365 and RF circuitry 370.

Figure 4:
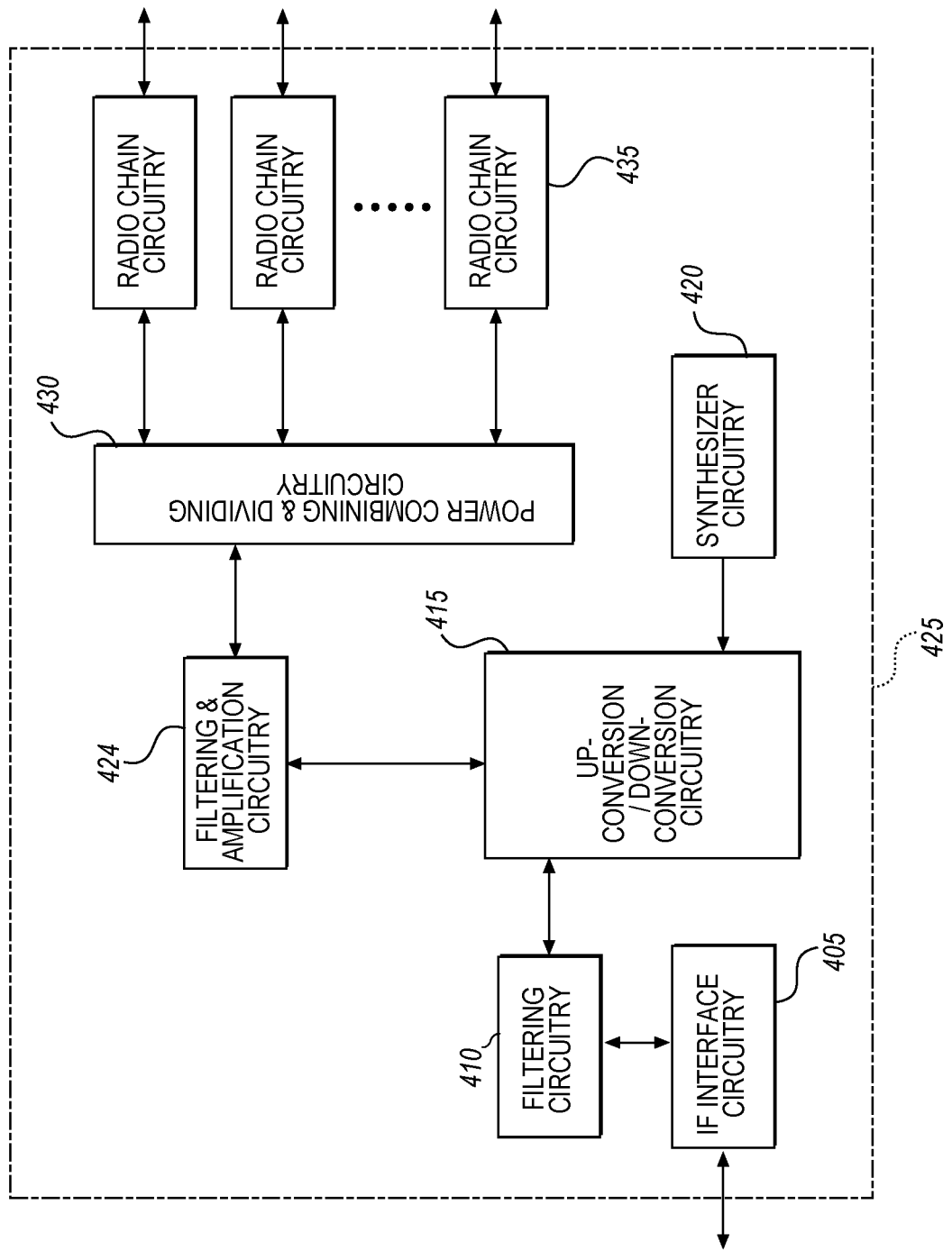
FIG. 4 illustrates exemplary useable RF circuitry in FIG. 3A according to some aspects.

FIG. 4 illustrates exemplary RF circuitry of FIG. 3A according to some aspects. In an aspect, RF circuitry 325 in FIG. 3A (depicted in FIG. 4 using reference number 425) may include one or more of the IF interface circuitry 405, filtering circuitry 410, up-conversion and down-conversion circuitry 415, synthesizer circuitry 420, filtering and amplification circuitry 424, power combining and dividing circuitry 430, and radio chain circuitry 435.

Figure 5:
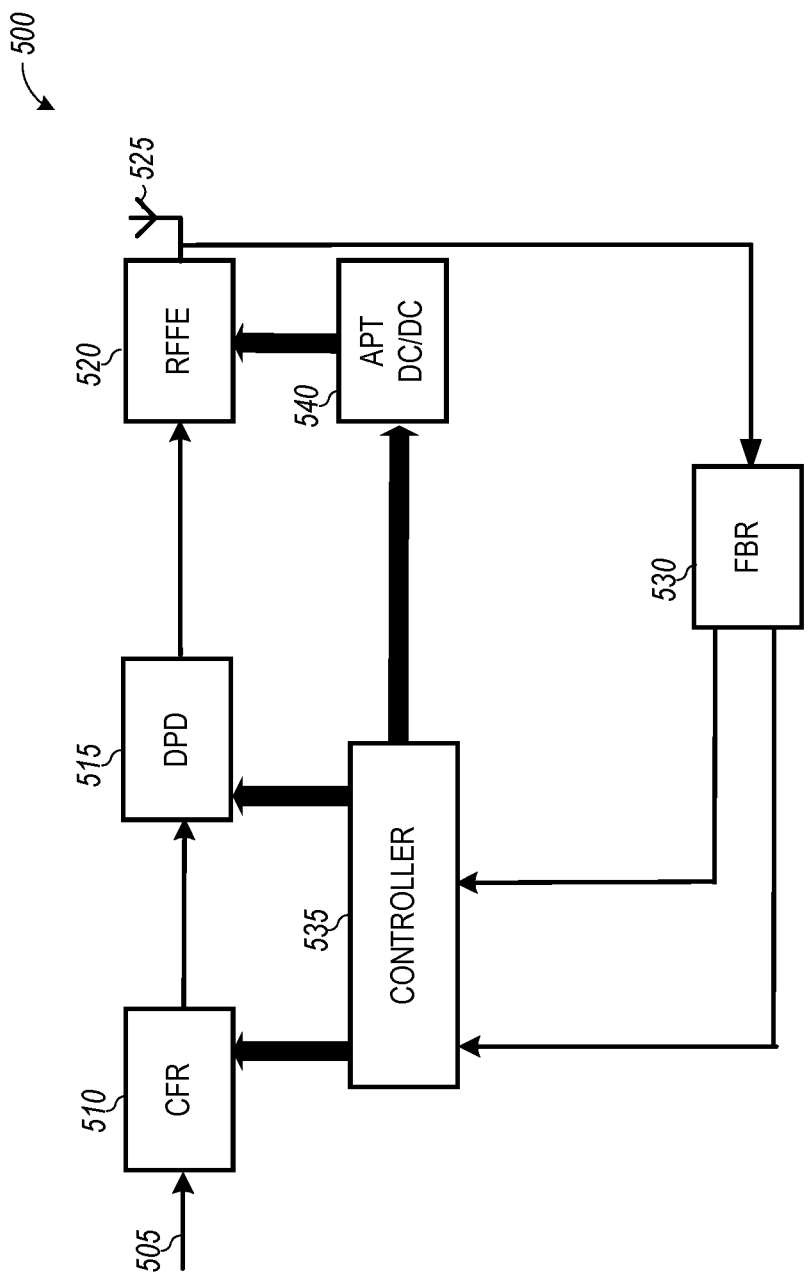
FIG. 5 illustrates a block diagram of filtering and amplification circuitry 400 in accordance with some aspects.

FIG. 5 illustrates a block diagram of filtering and amplification circuitry 500 in accordance with some aspects. In an aspect, the filtering and amplification circuitry 500 is the filtering and amplification circuitry 355 of FIG. 3 or filtering and amplification circuitry 424 of FIG. 4. This circuitry includes a CFR system 510, digital pre-distortion (DPD) circuitry 515, radio frequency front end (RFFE) 520, antenna 525, feedback receiver circuitry 530, controller 535, and DC/DC converter 540.

This circuitry 500 receives an input signal 505 at the crest factor reduction (CFR) system 510. The input signal 505 is of any type, including but not limited to baseband (BB), wide baseband, and the like. In an aspect, the reference signal is a sampling of in-phase and quadrature (IQ sampling) of a reference signal.

The CFR system 510 operates to reduce the peak-to-average ratio (PAR) of the input signal 505 to below that of a transmitted signal. The CFR system 510 is of any type, including but not limited to that provided in U.S. Pat. No. 9,154,168, and as described herein below.

The digital BB output from the CFR system 510 is then received at the digital DPD circuitry 515. The DPD circuitry 515 is of any type and operates in any manner to process the digital BB output from the CFR, and generates distortion components for the signal in order to compensate for distortion produced by the RFFE 520 that receives the signal from the DPD circuitry 515.

In an aspect, the DPD circuitry 515 is one provided in U.S. Pat. No. 9,787,336. Specifically, in some aspects, the distortion compensation functions may be based on distortion compensation tables, and the vector outputs may be based on a predetermined mapping between ranges (including but not limited to amplitude ranges) of values input to the distortion compensation tables and intra-table pointers to values within the distortion compensation tables. For a particular input sample, an intra-table pointer may be determined based on a predetermined mapping between amplitude ranges of the input signal and a candidate range of intra-table pointers. A distortion compensation vector for the input sample may be based on output values of the distortion compensation tables indexed within the distortion compensation tables by the determined intra-table pointer. A corresponding sample of the output signal may be based on a product of the input signal sample and an inner product between the distortion compensation vector and the common weight vector. In some aspects, the common weight vector may be used in the determination of all (or at least some) of the scale factors used for the sequence of input samples. That is, the scale factor for a particular input sample may be based on an inner product between the common weight vector and a sample-dependent vector (the distortion compensation vector) for the particular input sample.

In the RFFE 520, the output signal from the DPD circuitry 515 is converted to analog form, upconverted to radio frequency (RF), amplified with an amplifier and filtered for transmission over the air through the antenna 525. In addition, a sample of the RFFE output signal is received by the feedback receiver circuitry 530 for processing and modifying functioning of the CFR system 510, DPD circuitry 515, and RFFE 520.

In the feedback receiver circuitry 530, the RFFE output signal is down converted in frequency to BB and digitized. The feedback receiver circuitry 530 calculates sample output IQ samples and provides estimates of the average power of the RFFE output signal.

The controller 535 receives the calculated output IQ samples and average power estimates in addition to input signals 505 into the circuitry 500. Based on these variables, the controller 535 varies the reduction of PAR provided by the CFR system 510, distortion provided by the DPD 515, and varies supply voltage provided from the DC/DC converter 540 to a power amplifier (PA) of the RFFE 520. The DC/DC converter 540 may utilize an average power tracking (APT) system, other types of static, discrete signal amplitude tracking, envelope tracking (ET), and the like, to vary voltage to the PA. Therefore, based on the incoming input signal 505 and feedback information, the controller 535 coordinates the reduction in PAR, the distortion, and biasing voltage to a power amplifier to reduce and minimize the current utilized to provide the transmission signal, while still meeting linearity requirements.

Figure 6A:
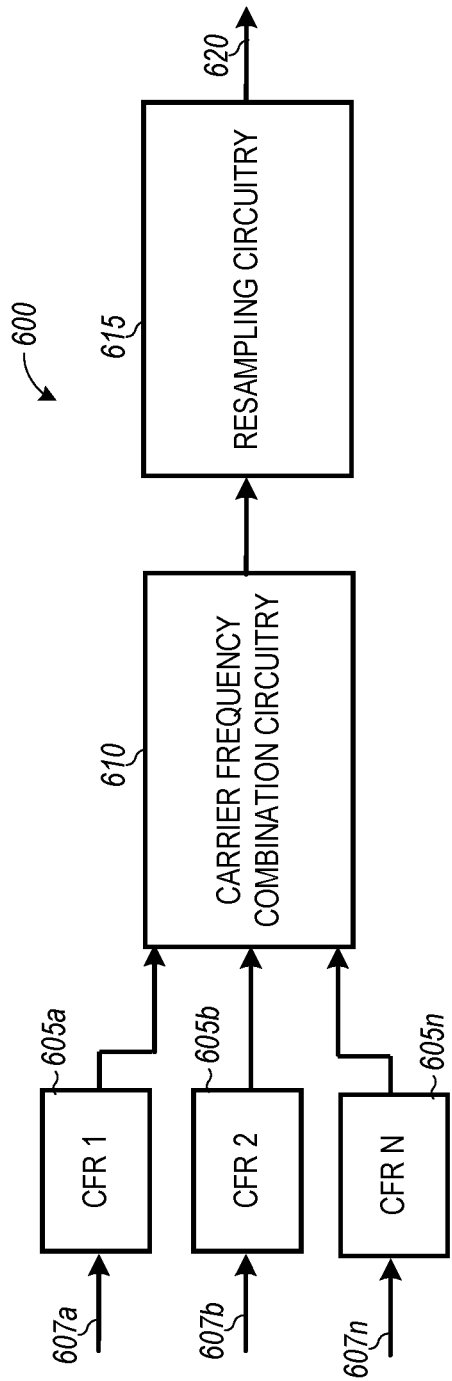
FIG. 6A illustrates block diagram of a crest factor reduction device in accordance with some aspects.

FIG. 6A illustrates an example CFR system 600 that may be used in the filtering and amplification circuitry 500 of FIG. 5, filtering and amplification circuitry 355 of FIG. 3, or filtering and amplification circuitry 424 of FIG. 4. The CFR system 600 includes a plurality of CFR circuits 605a, 605b, 605n. In this manner, a wideband digital BB signal, such as a 5G wideband digital BB signal may be separated into N carrier components 607a, 607b, . . . , 607n, where N is any number of components. Each CFR circuitry 605a, 605b, . . . , 605n reduces the PAR of each wideband signal carrier component. A signal combination circuitry 610 then upconverts the output signals from the CFR circuits 605a, 605b, . . . , 605n to intermediate frequency (IF) values to synthesize the composite transmission signal. Because of CFR circuits 605a, 605b, . . . , 605n the composite transmission signal exhibits a reduced PAR than an unprocessed signal. A resampling circuitry 615 then receives the output of the signal combination circuitry 610 to convert the sampling rate of the signal to a higher value to support front end circuitry and provide a composite crest factor reduction signal 620.

Figure 6B:
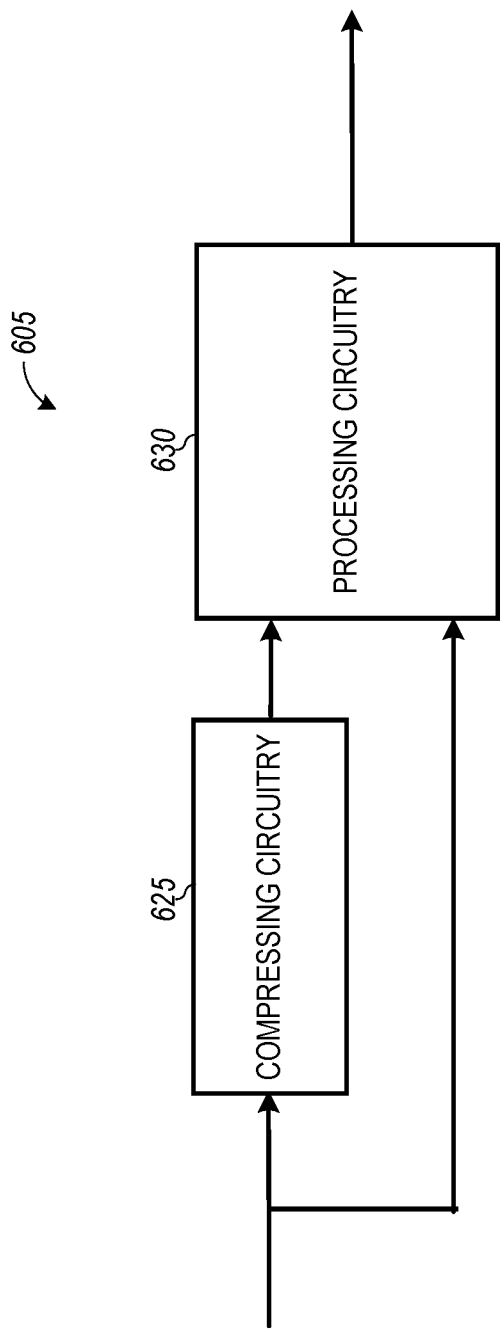
FIG. 6B illustrates a block diagram of a crest factor reduction circuitry of a crest factor reduction device in accordance with some aspects.

FIG. 6B illustrates a block diagram of an example CFR circuitry 605 that may be used in the filtering and amplification circuitry 355 of FIG. 3, filtering and amplification circuitry 424 of FIG. 4, or filtering and amplification circuitry 500 of FIG. 5. In an aspect, the CFR circuitry 605 is a CFR circuitry such as one of circuits 605a, 605b, . . . , 605n of FIG. 6A, arranged in accordance with at least one aspect described herein. The CFR circuitry 605 may be configured to receive an input signal and may include a compressing circuitry 625 and a processing circuitry 630 configured to perform operations with respect to the received input signal.

The input signal may be any suitable signal that may have its PAR reduced by the CFR circuitry 605. For example, in some aspects, the input signal may be a digital baseband quadrature phase signal that may include an in-phase (I) component and a quadrature (Q) component, such that the input signal may be a digital baseband IQ signal. In some aspects, the input signal may include information that may be intended for transmission via a wireless communication signal.

The compressing circuitry 625 may include any suitable system, apparatus, and/or device configured to receive the input signal, and compress an amplitude of the input signal to generate a compressed signal based on the input signal. For example, in some aspects, the compressing circuitry 625 may be configured to perform a clipping function to clip the amplitude of the input signal when the amplitude of the input signal exceeds a predetermined threshold. The predetermined threshold of the input signal may be based on a target PAR of the signal, such that the input signal may be clipped when the amplitude of the input signal is such that the input signal would otherwise exceed the target PAR of the input signal. The clipping operation may be a hard clipping operation, a soft clipping operation, and/or another type of clipping operation.

The compressing circuitry 625 may be communicatively coupled to the processing circuitry 630, such that the processing circuitry 630 may receive the compressed signal from the compressing circuitry 625. The processing circuitry 630 may also be configured to receive the input signal. The compression of the input signal to generate the compressed signal may cause distortion in the compressed signal.

As described in detail with respect to FIGS. 6A and 6B, the processing circuitry 630 may be configured to reduce the distortion in the compressed signal to generate an output signal that may have reduced distortion with respect to the compressed signal and that may also have a reduced PAR with respect to the input signal. The processing circuitry 630 may be configured to reduce the distortion based on the compressed signal and the input signal. In some aspects, the processing circuitry 630 may be configured to process the compressed signal so that the PAR and the distortion of the output signal are within a desired range for the output signal. Accordingly, the compressing circuitry 625 and the processing circuitry 630 of CFR circuitry 605 may be configured to produce an output signal with a reduced PAR while also reducing distortion that may be created during compression performed to reduce the PAR of the output signal with respect to the PAR of the input signal.

Figure 7:
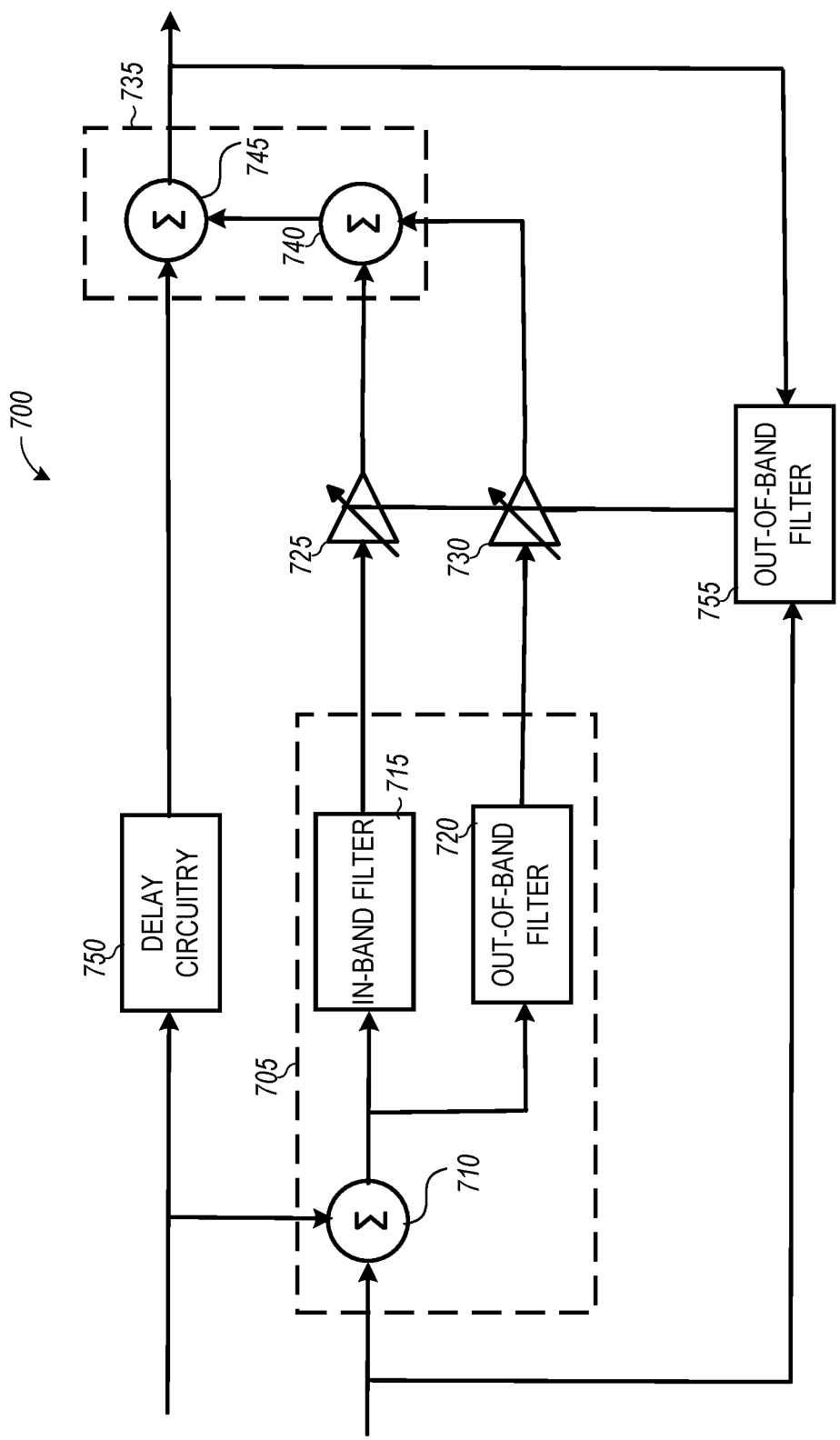
FIG. 7 illustrates a block diagram of a processing circuitry of a crest factor reduction circuitry in accordance with some aspects.

FIG. 7 illustrates a block diagram of an example aspect of a processing circuitry 700 that may be used in the filtering and amplification circuitry 355 of FIG. 3, filtering and amplification circuitry 424 of FIG. 4, or filtering and amplification circuitry 500 of FIG. 5. The processing circuitry 700 is arranged in accordance with at least one aspect described herein. As mentioned above, the processing circuitry 700 (which, in some aspects, can be the same as processing circuitry 610 of FIG. 6) may be configured to receive the compressed signal from a compressing circuitry, such as compressing circuitry 605 of FIG. 6, and may also be configured to receive the input signal. In some aspects, the processing circuitry 700 may include an error detection circuitry 705 configured to receive the compressed signal and the input signal.

The error detection circuitry 705 may include a comparator 710 configured to compare the compressed signal with the input signal to generate an error signal that may indicate distortion within the compressed signal with respect to the input signal. In some aspects, a difference between the input signal and the compressed signal may indicate the distortion within the compressed signal with respect to the input signal. Therefore, in the illustrated aspect, the comparator 710 may be configured to subtract the input signal from the compressed signal to generate the error signal, such that the error signal may indicate the distortion of the compressed signal with respect to the input signal.

In some aspects, the distortion within the compressed signal may be categorized as in-band distortion and out-of-band distortion. The in-band distortion may be distortion that occurs within the intended frequency range (referred to hereinafter as the "band-of-interest") of the output signal, and the out-of-band distortion may be distortion that occurs outside of the band-of-interest of the output signal. For example, when the output signal is a digital baseband signal, the in-band distortion may be distortion that may occur within a 3 dB bandwidth (BW) of the input signal and the out-of-band distortion may be distortion that occurs outside of the 3 dB BW of the input signal.

In some aspects, quality of the output signal generated by the processing circuitry 700 may be measured based on an error vector magnitude (EVM) of the output signal, which may indicate a deviation of locations of constellation points of the output signal with respect to their ideal locations. The EVM of the output signal may be affected by the amount of in-band distortion within the output signal. Additionally, the quality of the output signal may also be measured based on an adjacent channel leakage ratio (ACLR) of the output signal, which may indicate a ratio of the power of in-band frequencies of the output signal with respect to the power of out-of-band frequencies (e.g., frequencies adjacent to the in-band frequencies) within the output signal. The ACLR may be affected by the amount of out-of-band distortion within the output signal.

Therefore, in some aspects, the error detection circuitry 705 may be configured to generate an in-band error signal and an out-of-band error signal from the error signal output by the comparator 710, such that in-band distortion and/or out-of-band distortion of the output signal may be adjusted. In the illustrated aspect, the error detection circuitry 705 may include an in-band filter 715 and an out-of-band filter 720, each configured to receive the error signal from the comparator 710.

The in-band filter 715 may be any suitable filter configured to pass frequencies within the band-of-interest of the output signal and filter out frequencies substantially outside of the band-of-interest of the output signal. For example, when the output signal is a baseband signal, the band-of-interest may be the 3 dB BW of the input signal. Therefore, the in-band filter 715 may include a low-pass filter, such that the in-band filter 715 may output an in-band error signal that may include frequencies within the baseband and that may indicate in-band distortion of the compressed signal.

The out-of-band filter 720 may be any suitable filter configured to pass frequencies outside of the band-of-interest of the output signal, and filter out frequencies substantially inside of the band-of-interest of the output signal. For example, when the output signal is a baseband signal, the out-of-band filter 720 may include a high-pass filter. Accordingly, the out-of-band filter 720 may output an out-of-band error signal with frequencies outside of the baseband and that may indicate out-of-band distortion of the compressed signal.

The processing circuitry 700 may also include an in-band gain circuit 725 configured to receive the in-band error signal output by the in-band filter 715. The in-band gain circuit 725 may be any suitable system, apparatus, or device configured to apply a gain to the in-band error signal to produce an adjusted in-band error signal. The gain applied by the in-band error signal may be referred to hereinafter as an "in-band gain" and may be less than, equal to, or greater than one such that the in-band gain circuit 725 may attenuate, leave the same, or increase the power of the adjusted in-band error signal with respect to the in-band error signal received by the in-band gain circuit 725.

The processing circuitry 700 may also include an out-of-band gain circuit 730 configured to receive the out-of-band error signal output by the out-of-band filter 720. The out-of-band gain circuit 730 may be any suitable system, apparatus, or device configured to apply a gain to the out-of-band error signal to generate an adjusted out-of-band error signal. The gain applied by the out-of-band error signal may be referred to hereinafter as an "out-of-band" gain and may be less than, equal to, or greater than one, such that the out-of-band gain circuit 730 may attenuate, leave the same, or increase the power of the adjusted out-of-band error signal with respect to the out-of-band error signal received by the out-of-band gain circuit 730.

In some aspects, the processing circuitry 700 may also include a combining circuitry 735 configured to combine the compressed signal with the adjusted in-band error signal and the adjusted out-of-band error signal. In some aspects, the combining circuitry 735 may include a distortion combining circuitry 740 configured to receive the adjusted in-band error signal from the in-band gain circuit 725, and further configured to receive the adjusted out-of-band error signal from the out-of-band gain circuit 730. The distortion combining circuitry 740 may be configured to combine the adjusted in-band error signal and the adjusted out-of-band error signal to produce an adjusted error signal.

In some aspects, the combining circuitry 735 may also include an output signal circuitry 745 configured to receive the compressed signal and the adjusted error signal. The output signal circuitry 745 may be any suitable system, apparatus, or device configured to combine the adjusted error signal with the compressed signal such that the adjusted error signal may at least partially cancel out distortion (in-band and/or out-of-band distortion) within the compressed signal. Accordingly, the output signal circuitry 745 may be configured to produce an output signal from the compressed signal and the adjusted error signal such that distortion of the output signal may be reduced with respect to distortion of the compressed signal. In the illustrated aspect, the output signal circuitry 745 may be configured to subtract the adjusted error signal from the compressed signal to produce the output signal, such that the distortion of the compressed signal that may correspond to the adjusted error signal may be reduced or eliminated in the output signal.

In some aspects, the processing that may occur between the error detection circuitry 705 and the output signal circuitry 745 may have a delay. Accordingly, in some aspects, the processing 700 may include a delay circuitry 750 communicatively coupled to the output signal circuitry 745. The delay circuitry 750 may be configured to delay the compressed signal by substantially the same amount of time as the delay associated with the processing between the error detection circuitry 705 and the output signal circuitry 745. Therefore, the compressed signal (and its associated distortion) that may be received by the output signal circuitry 745 may substantially correspond to the adjusted error signal also received by the output signal circuitry 745.

In some aspects, an adaptation circuitry 755 receives the input signal and the output signal of each processing circuitry 700 to adjust the in-band gain circuit 725 and the out-of-band gain circuit 730 of the processing circuitry. In an aspect each CFR circuitry of a CFR system utilizes a single shared adaptation circuitry 755.

In some aspects, the adaption circuitry 755 is configured to adjust the in-band gain and/or the out-of-band gain, such that the in-band distortion and/or the out-of-band distortion of the output signal may be adjusted. In these or other aspects, the adaptation circuitry 755 may be configured to adjust the in-band gain and/or the out-of-band gain, such that the in-band distortion and/or the out-of-band distortion of the output signal are within specified ranges. For example, in some aspects, the adaptation circuitry 755 may be configured to adjust the in-band gain of the in-band gain circuit 725, such that the EVM of the output signal—which may be affected by the magnitude of the adjusted in-band error signal—may be within a target EVM range. In these or other aspects, the adaptation circuitry 755 may also be configured to adjust the out-of-band gain of the out-of-band gain circuit 730, such that a transmitter or transmit spectral mask of the output signal—which may be affected by the magnitude of the adjusted in band error signal—may be within a target mask range. Mask readings are a measure of power spectral density for a given frequency. In these, or other aspects, the adaptation circuitry 755 may also be configured to adjust the out-of-band gain of the out-of-band gain circuit 730, such that the ACLR of the output signal—which may be affected by the magnitude of the adjusted out-of-band error signal—may be within a target ACLR range.

Figure 8:
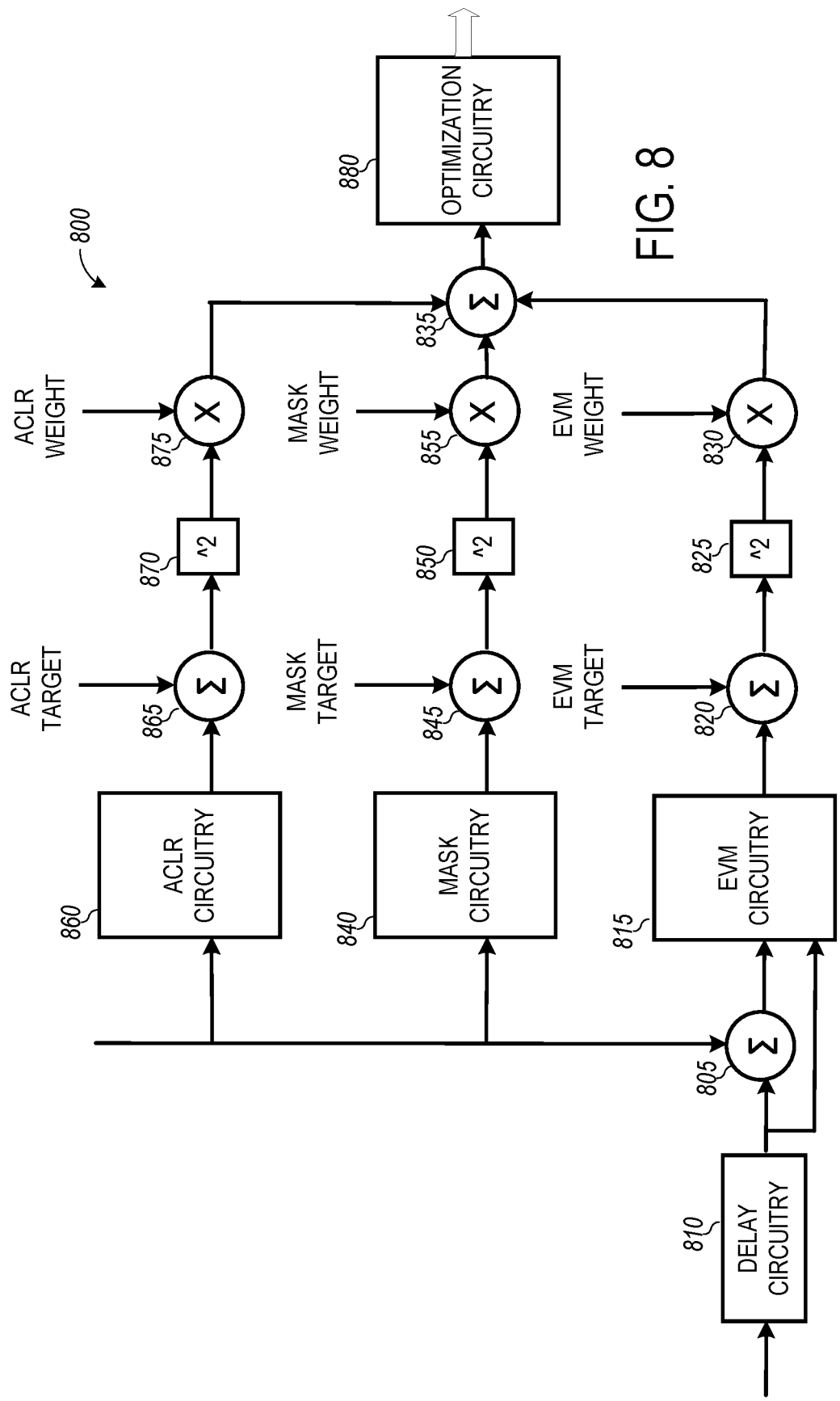
FIG. 8 illustrates a block diagram of an adaptation circuitry of a processing circuitry in accordance with some aspects.

FIG. 8 illustrates an example adaptation circuitry 800 that, in an aspect, can be the adaptation circuitry 755 of FIG. 7. To that end, the adaptation circuitry may be used in the filtering and amplification circuitry 355 of FIG. 3, filtering and amplification circuitry 424 of FIG. 4, or filtering and amplification circuitry 500 of FIG. 5. The adaptation circuitry 800 may be configured to receive inputs from more than one CFR circuitry of a CFR system. The adaptation circuitry 800 may be further configured to receive the input signal and the output signal. Additionally, the adaptation circuitry 800 may be configured to determine the EVM, mask, and/or ACLR of the output signal.

With respect to the EVM of the output signal, in the illustrated aspect, the adaptation circuitry 800 may include a difference detection circuitry 805 configured to receive the input signal and the output signal, and determine a difference between the output signal and the input signal. The difference between the output signal and the input signal may indicate distortion between the output signal and the input signal, such that the difference detection circuitry 805 may generate an output error signal. In the illustrated aspect, the difference detection circuitry 805 may generate the output error signal by subtracting the input signal from the output signal. However, any other suitable operation may be performed to generate the output error signal indicating the distortion between the output signal and the input signal.

Additionally, as mentioned in aspects above, a delay may occur from when a processing circuitry receives the input signal and generates the output signal that may correspond with the received input signal. Therefore, in some aspects, the adaptation circuitry 800 includes a delay circuitry 810 that is configured to receive and delay the input signal, such that the input signal received by the difference detection circuitry 805 may substantially correspond with the output signal also received by the difference detection circuitry 805.

The adaptation circuitry 800 may also include an EVM circuitry 815 configured to receive the output error signal and the input signal. The EVM circuitry 815 may be configured to determine the EVM of the output signal with respect to the input signal based on the input signal and the output error signal. The EVM circuitry 815 may determine the EVM of the output signal using any suitable procedure for calculating EVM based on the output error signal and the input signal. The EVM circuitry 815 may be configured to communicate the EVM toward an EVM comparator 820 of the adaptation circuitry 800.

The EVM comparator 820 may be any suitable system, apparatus, or device configured to compare the EVM output by the EVM circuitry 815 with an EVM target to determine how close the EVM of the output signal is to the target EVM. The EVM comparator 820 may accordingly output an EVM comparison that may indicate how close the EVM of the output signal is to the target EVM. In some aspects, the EVM target may be based on a desired range or specification requirement of EVM of the output signal. In the illustrated aspect, the EVM comparator 820 may be configured to subtract the EVM of the output signal from the EVM target to compare the EVM of the output signal with the target EVM.

In some aspects, the adaptation circuitry 800 may include an EVM comparison squaring circuitry 825 that may be configured to square the EVM comparison that may be output by the EVM comparator 820. Accordingly, the squared EVM may indicate a difference between the EVM of the output signal and the target EVM without regard to whether the difference is positive or negative.

The squared EVM may be received by an EVM weighting circuitry 830 of the adaptation circuitry 800, which may apply an EVM weight to the squared EVM. As described in more detail below, the results of the EVM operations may be combined with results of mask operations and ACLR operations, and the in-band gain and/or the out-of-band gain may be adjusted based on the combined EVM, mask, and/or ACLR computation results such that the distortion of the output signal may be substantially within a desired range. In some aspects, the EVM may have a higher or lower weight than the mask and/or the ACLR in determining and adjusting the in-band gain and/or the out-of-band gain. Accordingly, the EVM weight may be based on the amount of weight that may be given to EVM in determining and adjusting the in-band gain and/or the out-of-band gain.

The adaptation circuitry 800 may also include a combining circuitry 835 configured to receive the weighted EVM that may be output by the EVM weighting circuitry 830. The combining circuitry 835 may be configured to combine the weighted EVM with a weighted mask and weighted ACLR that may be determined as described below. Accordingly, the combining circuitry 835 may be configured to output a combined distortion indicator that may include both in-band and out-of-band distortion indicators (e.g., weighted EVM, mask, and/or ACLR results).

With respect to the mask, the adaptation circuitry 800 may also include a mask circuitry 840 configured to receive the output signal and determine mask values of the output signal. The mask circuitry 840 may determine the mask of the output signal using any suitable procedure for calculating a mask. The mask circuitry 840 may be configured to communicate the mask toward a mask comparator 845 of the adaptation circuitry 800.

The mask comparator 845 may be any suitable system, apparatus, or device configured to compare the mask output by the mask circuitry 840 with a mask target to determine how close the mask of the output signal is to the target mask. The mask comparator 845 may accordingly output a mask comparison that may indicate how close the mask of the output signal is to the target mask. In some aspects, the mask target may be based on a desired range or specification requirement of mask of the output signal. In the illustrated aspect, the mask comparator mask may be configured to subtract the mask of the output signal from the mask target to compare the mask of the output signal with the target mask.

In some aspects, the adaptation circuitry 800 may include a mask comparison squaring circuitry 850 that may be analogous to the EVM comparison squaring circuitry 825 and that may be configured to square the mask comparison that may be output by the mask comparator 845. Accordingly, the squared mask output by the mask comparison squaring circuitry 845 may indicate a difference between the mask of the output signal and the target mask without regard to whether the difference is positive or negative.

The squared mask may be received by a mask weighting circuitry 855 of the adaptation circuitry 800. Similar to the EVM weighting circuitry 830 weighting the squared EVM as described above, the mask weighting circuitry 855 may be configured to apply a mask weight to the squared mask. The mask weight may be based on the amount of weight that may be given to mask in determining and adjusting the in-band gain and/or the out-of-band gain. The weighted mask may consequently be received by the combining circuitry 835 and may be combined with the weighted EVM and a weight ACLR to generate the combined distortion indicator.

With respect to ACLR, the adaptation circuitry 800 may also include an ACLR circuitry 860 configured to receive the output signal and determine the ACLR of the output signal. The ACLR circuitry 860 may determine the ACLR of the output signal using any suitable procedure for calculating ACLR. The ACLR circuitry 860 may be configured to communicate the ACLR toward an ACLR comparator 865 of the adaptation circuitry 800.

The ACLR comparator 865 may be any suitable system, apparatus, or device configured to compare the ACLR output by the ACLR circuitry 860 with an ACLR target to determine how close the ACLR of the output signal is to the target ACLR. The ACLR comparator 865 may accordingly output an ACLR comparison that may indicate how close the ACLR of the output signal is to the target ACLR. In some aspects, the ACLR target may be based on a desired range or specification requirement of ACLR of the output signal. In the illustrated aspect, the ACLR comparator 865 may be configured to subtract the ACLR of the output signal from the ACLR target to compare the ACLR of the output signal with the target ACLR.

In some aspects, the adaptation circuitry 800 may include an ACLR comparison squaring circuitry 870 that may be analogous to the EVM comparison squaring circuitry, or mask squaring circuitry, and that may be configured to square the ACLR comparison output by the ACLR comparator 865. Accordingly, the squared ACLR output by the ACLR comparison squaring circuitry 870 may indicate a difference between the ACLR of the output signal and the target ACLR without regard to whether the difference is positive or negative.

The squared ACLR may be received by an ACLR weighting circuitry 875 of the adaptation circuitry 800. Similar to the EVM and mask weighting circuitries weighting the squared EVM and the mask as described above, the ACLR weighting circuitry 875 may be configured to apply an ACLR weight to the squared ACLR. The ACLR weight may be based on the amount of weight that may be given to ACLR in determining and adjusting the in-band gain and/or the out-of-band gain. The weighted ACLR may consequently be received by the combining circuitry 835, and may be combined with the weighted EVM and weighted mask to generate the combined distortion indicator.

In some aspects, the adaptation circuitry 800 may include an optimization circuitry 880 that may be configured to receive the combined distortion indicator from the combining circuitry 835. The optimization circuitry 880 may be configured to determine the in-band gain and/or the out-of-band gain based on the combined distortion indicator and any suitable optimization scheme. The optimization circuitry 880 may be communicatively coupled to the in-band gain circuit and the out-of-band gain circuit of a processing circuitry such that the optimization circuitry 880 may adjust the in-band gain and/or the out-of-band gain based on the determined in-band gain and the determined out-of-band gain.

The optimization scheme may be any suitable optimization scheme configured to determine the in-band and/or out-of-band gains such that the distortion (in-band and/or out-of-band) of the output signal may be within a desired range. As described above, in some aspects, the desired in-band and out-of-band distortion ranges of the output signal may be indicated by EVM, mask, and/or ACLR targets, respectively, of the output signal.

For example, in some aspects, the optimization circuitry 880 may be configured to perform a gradient optimization algorithm with respect to the combined distortion indicator and the in-band and/or out-of-band gains according to the following expression:

$$g(k+1) = g(k) - .\text{mu}. .\text{gradient}. f(x,g)$$

In the above expression "g(k+1)" may represent the determined gain (in-band or out-of-band, depending on which gain is being determined); "g(k)" may represent a previous gain; ".mu." may represent a step size parameter that may be used to control the speed of convergence of the gradient function; ".gradient." may represent the gradient operator; and "f(x,g)" may represent a cost function that may yield the combined distortion indicator, which may depend on the gain and the input signal.

The optimization circuitry 880 may set the in-band and/or out-of-band gain based on the results of applying the optimization algorithm to the combined distortion indicator and the respective gain, which may accordingly adjust the EVM, mask, and/or ACLR of the output signal such that the EVM, mask, and/or ACLR may move substantially toward or within the respective target values of the EVM, mask, and/or ACLR.

Therefore, the adaptation circuitry 800 may help substantially maintain the distortion of the output signal at a desired level. Modifications, additions, or omissions may be made to the crest factor reduction system, without departing from the scope of the present disclosure. For example, although the optimization circuitry 880 is described above as performing a gradient optimization, the present disclosure is not limited to the optimization circuitry 880 performing optimization based on a gradient optimization algorithm. Consequently, the adaptation circuitry 800 may adaptively change the parameters of the compression circuitry, such as amplitude clipping level, compression level, attach ratio, nonlinear order, and the like.

Figure 9:
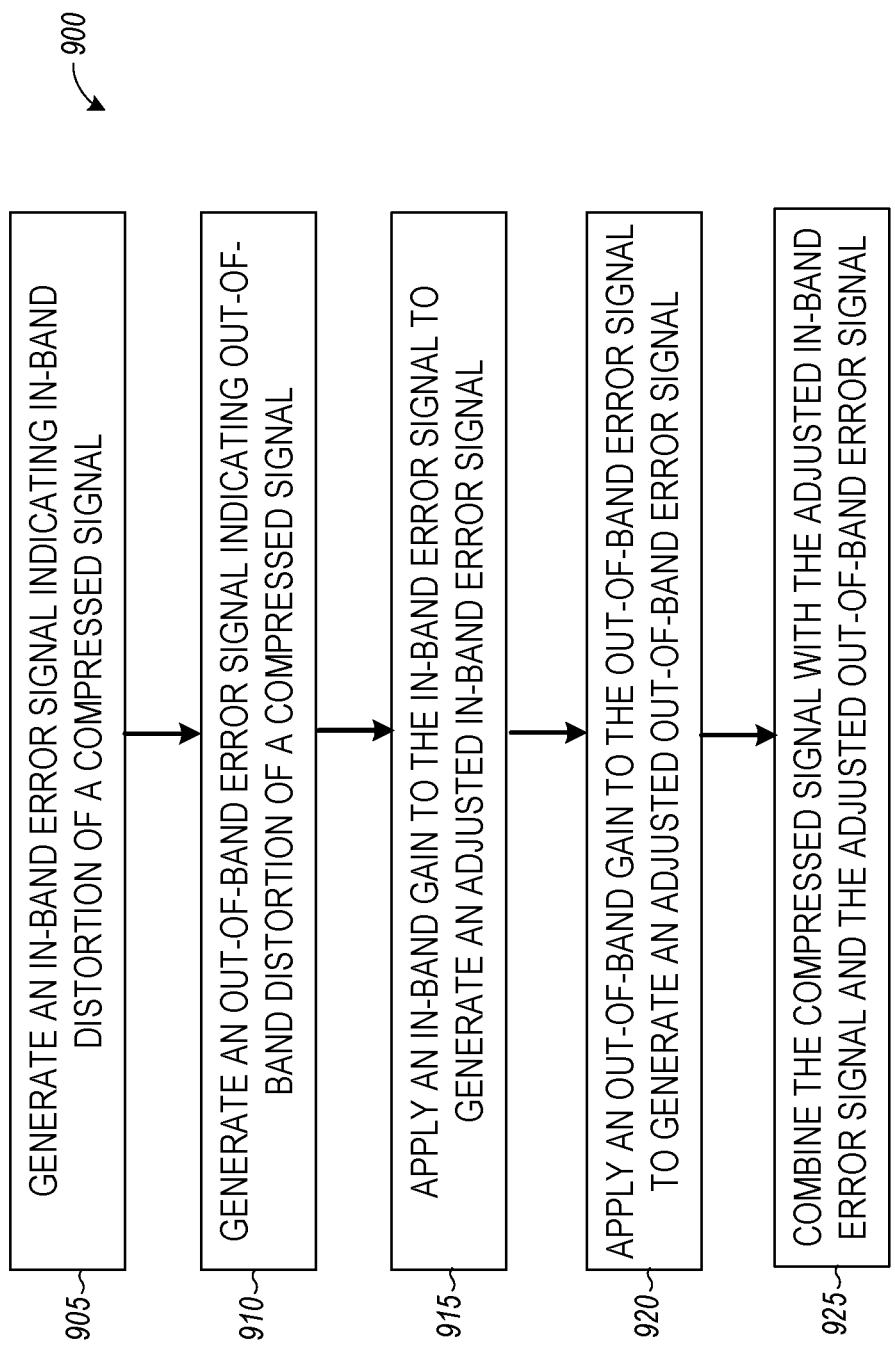
FIG. 9 illustrates a block flow chart of an example method of reducing the PAR of a signal in accordance with some aspects.

FIG. 9 is a flow chart of an example method 900 of reducing the PAR of a signal, arranged in accordance with at least one aspect described herein. The method 900 may be implemented, in some aspects, by one or more components of a crest factor reduction system, such as the crest factor reduction system 510, crest factor circuitries 605, 605a, 605b, . . . , 605n, and other components described herein with respect to any of FIGS. 5-8. Although illustrated as discrete blocks, various blocks may be divided into additional blocks, combined into fewer blocks, or eliminated, depending on the desired implementation.

The method 900 may begin at operation 905, where an in-band error signal may be generated. The in-band error signal may indicate in-band distortion of a compressed signal with respect to an input signal from which the compressed signal is generated. In some aspects, the in-band error signal may be generated by comparing the input signal with the compressed signal to generate an error signal and then filtering the error signal based on an in-band frequency range. At operation 910, an out-of-band error signal may be generated. The out-of-band error signal may indicate out-of-band distortion of the compressed signal with respect to the input signal. In some aspects, the out-of-band error signal may be generated by filtering the error signal based on an out-of-band frequency range.

At operation 915, an in-band gain may be applied to the in-band error signal to generate an adjusted in-band error signal. At operation 920, an out-of-band gain may be applied to the out-of-band error signal to generate an adjusted out-of-band error signal.

At operation 925, the compressed signal may be combined with the adjusted in-band error signal and the adjusted out-of-band error signal to generate an output signal. The compressed signal may be combined with the adjusted in-band error signal and the adjusted out-of-band error signal, and the in-band gain and the out-of-band gain may be based on the output signal, such that distortion (in-band and/or out-of-band) of the output signal may be reduced with respect to distortion of the compressed signal.

In some aspects, in-band distortion of the output signal may be determined based on EVM of the output signal with respect to the input signal, and/or out-of-band distortion of the output signal may be determined based on a mask of the output signal, and/or out-of-band distortion of the output signal may be determined based on an ACLR of the output signal. In some aspects, the in-band gain and/or out-of-band gain may be adjusted based on a comparison of the in-band distortion of the output signal with an in-band distortion target. In these or other aspects, the in-band gain and/or the out-of-band gain may be adjusted based on a comparison of the out-of-band distortion of the output signal with an out-of-band distortion target. In these or other aspects, the in-band distortion target may be based on a target EVM of the output signal, and/or a target mask of the output signal, and/or the out-of-band distortion target may be based on a target ACLR of the output signal.

For this and other processes and methods disclosed herein, the functions performed in the processes and methods may be implemented in differing order. For example, in some aspects, the method 900 may include operations associated with compressing (e.g., clipping) the amplitude of the input signal to generate the compressed signal. Furthermore, the outlined steps and operations are only provided as examples, and some of the steps and operations may be optional, combined into fewer steps and operations, or expanded into additional steps and operations without detracting from the essence of the disclosed aspects.

Figure 10:
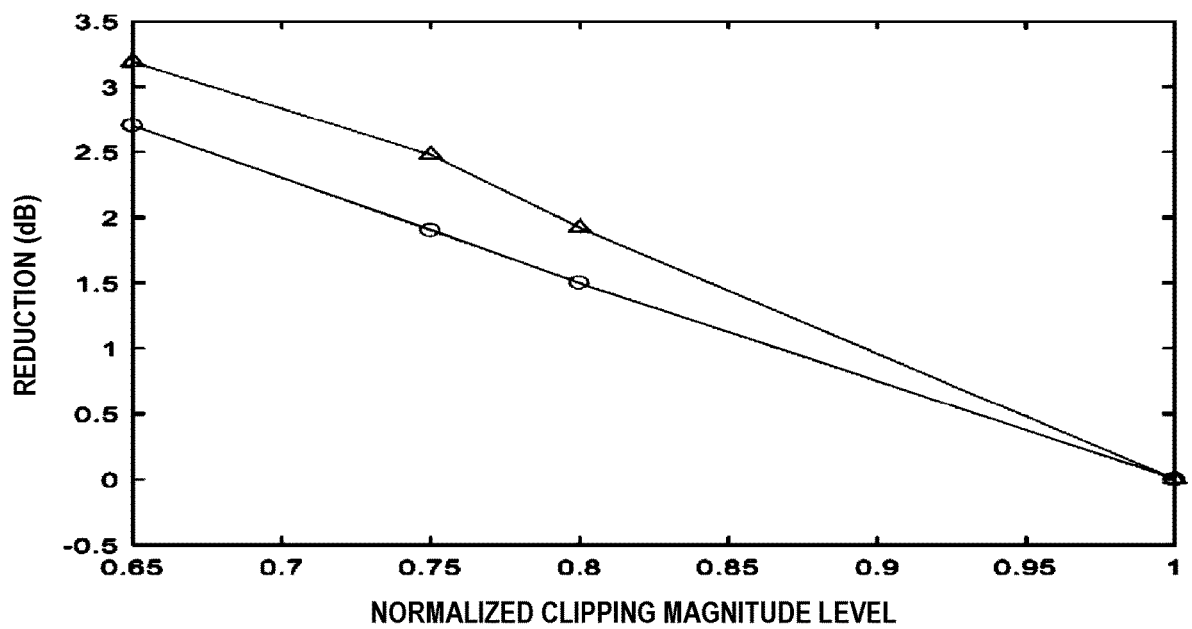
FIG. 10 illustrates a graph of normalized clipping magnitude level vs. reduction in decibels in accordance with some aspects.

FIG. 10 shows a plot of PAR and CFR with a plot of normalized clipping magnitude level versus reduction in decibels in a simulation using 100 MHz wideband (WB) 5 G signal with five 20 MHz component carriers for the CFR system of FIGS. 5-8. Up to 3.2 dB of crest factor reduction was obtained with adjacent channel leakage ratio, or ACLR, smaller than or equal to 50 dBc and EVM smaller than or equal to 2%. Thus, improved power reduction over previous filtering and amplification circuitry is presented, resulting in current savings within the system without a corresponding performance reduction.

Figure 11:
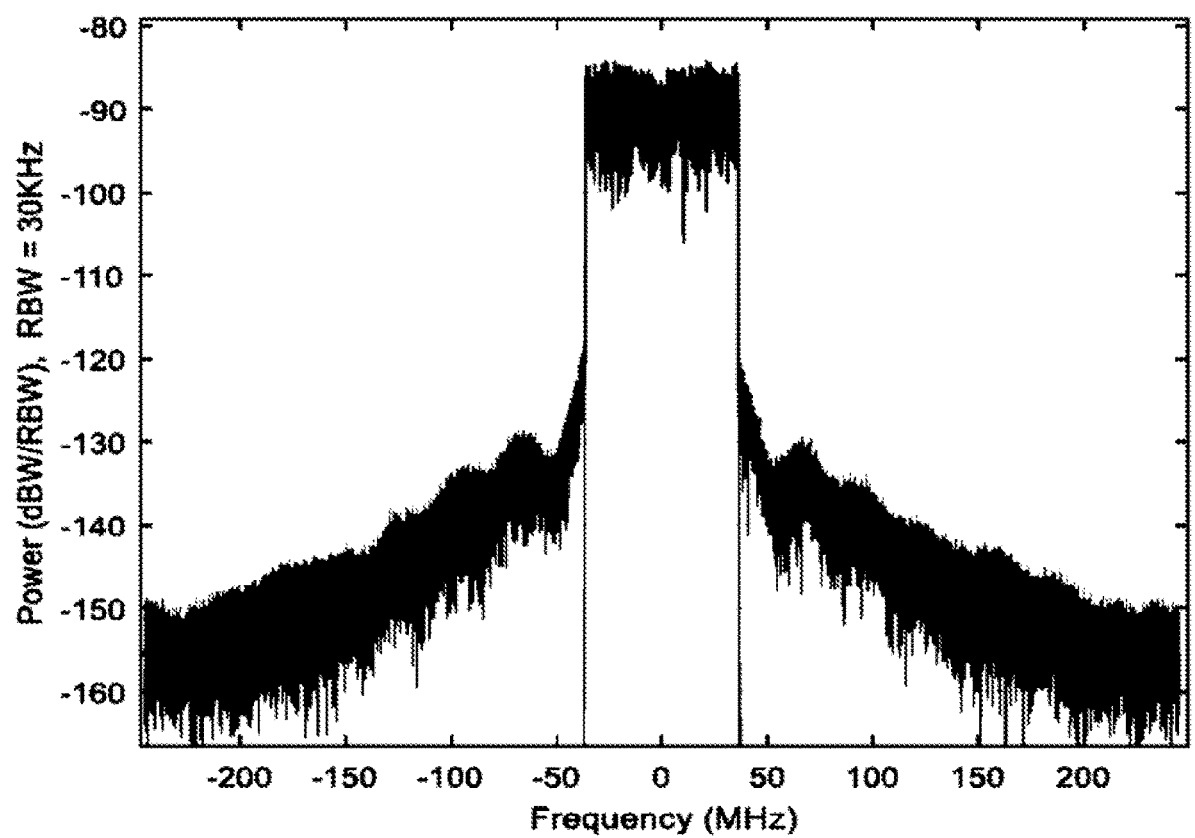
FIG. 11 illustrates a graph of power spectral density in accordance with some aspects.

FIG. 11 shows a plot of an example transmit spectral mask. The graph illustrates power spectral density of the output signal for the CFR system of FIGS. 5-8. In the illustrated graph, power is measured in dBW/RBW, where RBW=30 KHz. Thus, even with reduced power consumption signal performance is maintained.

Figure 12:
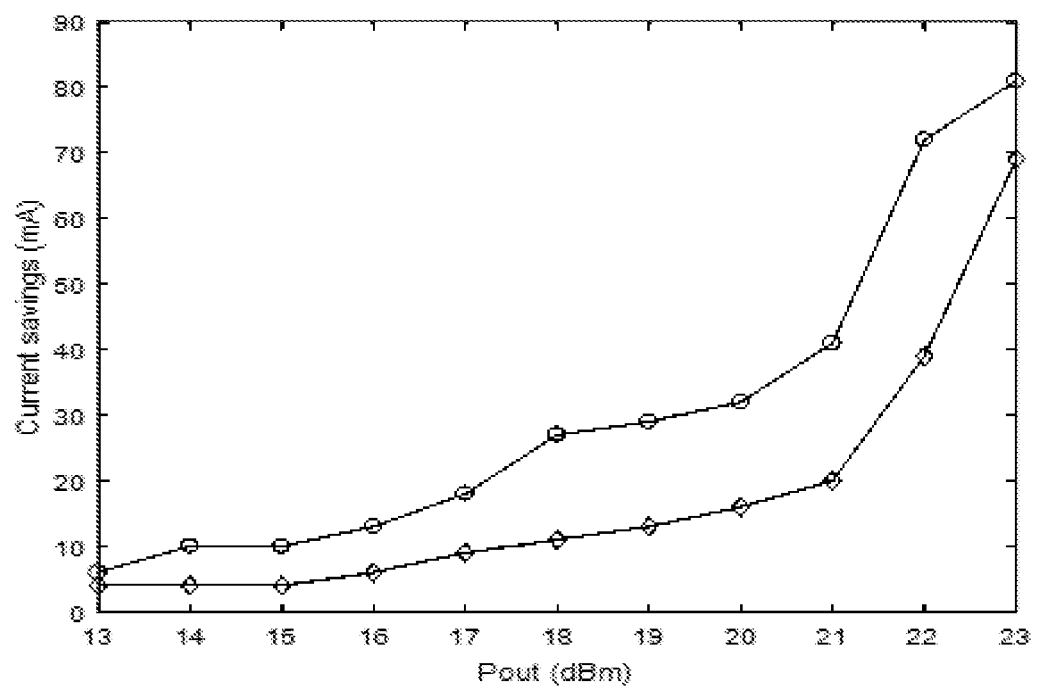
FIG. 12 illustrates a graph of the current reduction vs. power output in accordance with some aspects.

FIG. 12 shows a plot of the current reduction versus power output with the ACLR at 38 dBc and the error vector magnitude (EVM) smaller than or equal 3% for circuitry 400 of FIG. 4. As shown in the plot, a current drain of up to 82 mA is presented when using both a CFR system and a DPD circuitry in accordance with aspects described herein. Even when the DPD was bypassed, a 68 mA current reduction was still presented.

Figure 13:
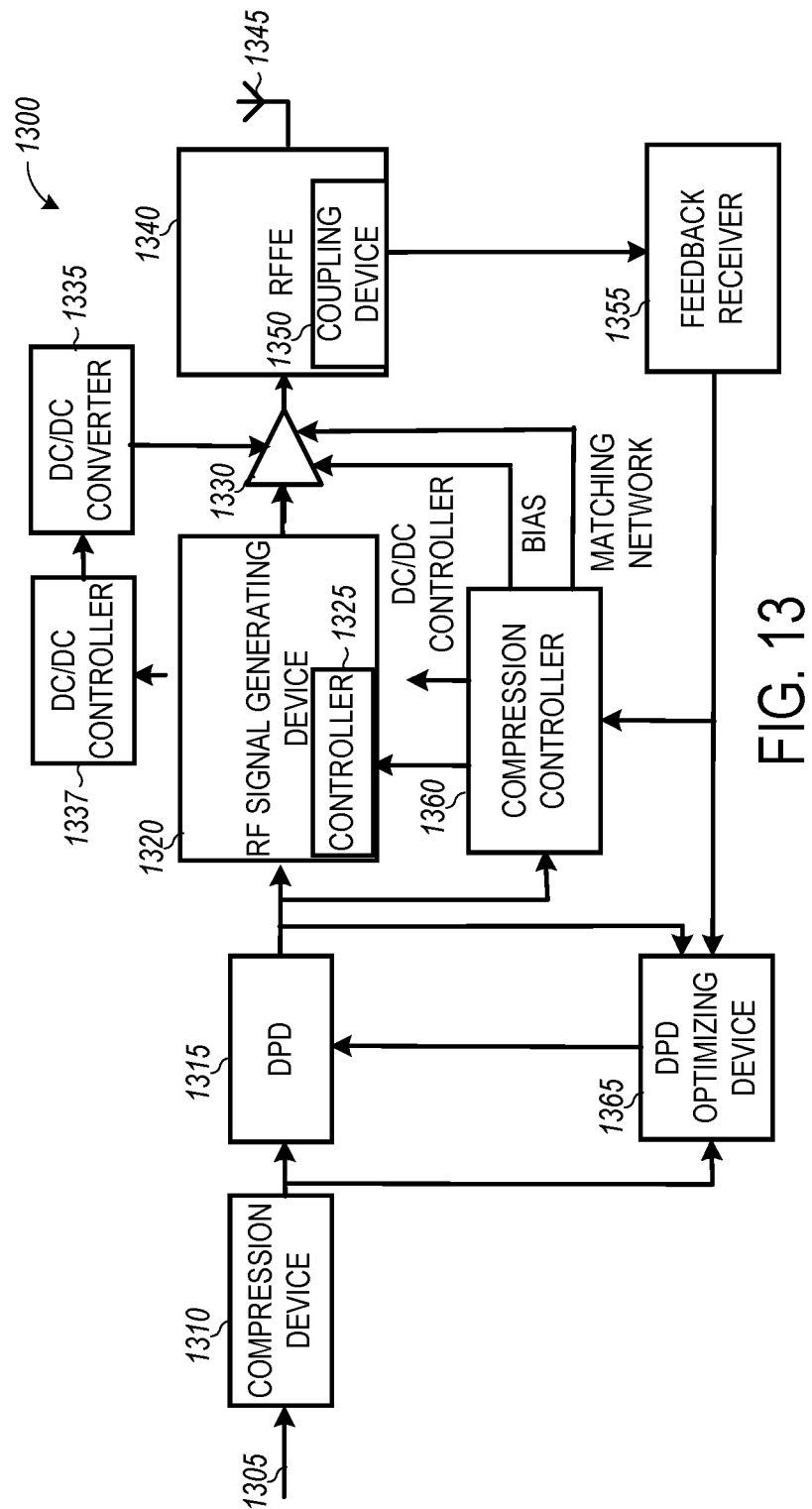
FIG. 13 illustrates a block diagram of filtering and amplification circuitry in accordance with some aspects.

FIG. 13 illustrates a block diagram of another example filtering and amplification circuitry 1300 in accordance with some aspects. In an example, the filtering and amplification circuitry 1300 is the filtering and amplification circuitry 355 of FIG. 3 or the filtering and amplification circuitry 424 of FIG. 4. In an aspect, the filtering and amplification circuitry 1300 includes a compression device 1310, a digital pre-distortion device (DPD) 1315, a radio frequency (RF) generation device 1320, a power controller 1325, a power amplifier (PA) 1330, a DCDC converter 1335, a DCDC controller 1337, a RF front end (RFFE) system 1340, an antenna 1345, a coupling device 1350, a feedback receiver 1355, a compression controller 1360, and a digital pre-distortion (DPD) optimizing device 1365.

This circuitry 1300 receives an input signal 1305 at the compression device 1310. The input signal 1305 is of any type, including but not limited to baseband (BB), wide baseband, and the like. After compression is applied by the compression device 1310, the signal is received by the digital pre-distortion device 1315 to provide distortion to the signal prior to amplification. In one aspect, the digital pre-distortion device 1315 is within a baseband integrated circuit (IC), whereas in another aspect, the device 1315 is in a transceiver IC. In yet another aspect, the device 1315 is distributed between both a baseband IC and a transceiver IC. The pre-distorted signal is then received by the RF generation device 1320 that is operated by the power controller 1325 to up-convert a BB signal to an RF domain. The signal is then received by the PA 1330.

The PA 1330 receives supply voltage from the DCDC converter 1335 that is controlled by the DCDC controller 1337. The DCDC converter 1335 may operate in an APT mode, an ET mode, or the like. Based on the input signal and the supply voltage, gain of the signal is varied before the signal is sent to the RFFE system 1340. In some aspects, the PA 1330 is part of the RFFE system 1340. The RFFE system 1340 processes the signal from the PA 1330 and sends the processed signal to the antenna 1345 for transmission. The RFFE system 1340 additionally includes the coupling device 1350, such as a coupler, that communicates the RFFE system transmission signal to the feedback receiver 1355.

The feedback receiver 1355 receives the RFFE system transmission signal from the coupling device 1350 at an RF signal conditioning and down-conversion circuitry to down convert the signal. The feedback receiver 1355 also includes an analog-to-DC converter and a BB signal conditioner. Thus, through the feedback receiver 1355, the RF signal is down converted to a BB domain, and is also further processed by running a time alignment with reference data, scaling, offset removal, and the like. The feedback signal is then received by both the compression controller 1360 and the digital pre-distortion (DPD) optimizing device 1365.

The compression controller 1360 receives inputs from both the feedback receiver 1355 and the digital pre-distortion device 1315. The compression controller 1360 additionally communicates with and controls the power controller 1325 of the RF generation device 1320, the DCDC controller 1337, biasing current to the power amplifier 1330, matching network change of the power amplifier 1330 and the compression device 1310. Specifically, the compression controller 1360 is able to vary the compression of an input signal by varying the compression applied by the compression device 1310, or by varying compression of the PA 1330 through any one of the biasing current, supply voltage, matching network change, or the RF generation device 1320.

The output power capability of the PA 1330 is configured by the PA supply voltage as set by the DCDC converter 1335, by PA quiescent current setting, and by the matching network setting in case of a tunable PA matching. The higher the supply voltage (VCC) or quiescent current increase, increases the output power capability of the PA and subsequently reduces the compression of the PA for a given average output power.

The compression controller 1360, in an aspect, can include software running on a processor, increasing flexibility of the circuitry 1300 compared to a hardware controller. In another aspect, the compression controller is hardware, reducing current during data processing compared to a software controller. The compression controller 1360, in another aspect, is located within a transceiver IC. Alternatively, the compression controller 1360 in an aspect is located within a BB IC. In yet another aspect, the compression controller 1360 is located partially in both a transceiver IC and a BB IC.

When monitoring the reference signal with the compression controller 1360, the peak levels after predistortion are of interest. Typically, the DPD device 1315 increases the peak-to-power ratio (PAPR) of the waveform due to the PA 1330 introducing compression based on its configuration to save current. An increased PAPR can be of concern in instances when the peaks exceed the peak power capability of the RF generation device 1320. Thus, peak levels, or any other metric that is appropriate to identify critical signal conditions that overdrive the RF generation device 1320 degrading its ACLR and EVM performance, can be monitored. When monitoring the coupled signal, the higher the PA compression is the more severe the ACLR degradation if the DPD device 1315 and subsequent RF generation device 1320 cannot compensate the gain decrease. Specifically, a high gain decrease at the peak levels as a result of PA compression results in a corresponding gain expansion in the DPD device 1315 that may exceed the peak power capabilities of the RF generation device 1320. If a threshold PA compression is exceeded, the DPD device 1315 cannot maintain ACLR and EVM performance, negatively impacting quality of service (QoS) targets such as data throughput.

When the compression controller 1360 identifies a critical PA compression, the controller 1360 is configured to change the PA output power capability, e.g., by increasing the PA supply voltage or quiescent current. As a result, the compression is reduced and ACLR is recovered. As an additional advantage, the higher VCC has a minor impact on the battery current. Higher compression due to load mismatch indicates that the PA 1330 is loaded by a so called high-Z load. A Z-load is the impedance load at a collector in case of a HBT device. Higher compression reduces the saturated power of the PA 1330, while increasing the efficiency of the PA 1330. Consequently, the battery current increases due to a higher VCC, but the current is still the same or even lower compared to nominal load conditions with lower VCC.

In an aspect, the compression controller 1360 can be configured to add additional compression of the reference signal. Specifically, the PA 1330 compression degrades the ACLR. The DPD optimizing device 1365 based on feedback compensates as long as the peak power capability of the RF generation block device 1320 is not exceeded. In instances when the peak power goes above a threshold peak, the reference signal is compressed. The DPD optimizing device 1365 does not compensate the compression at the peaks because compensation is already given by the compressed reference signal. As a result, the PAPR increase of the pre-distorted signal is mitigated.

As a result of the compression controller 1360 introducing compression to the input or reference signal, distortions are introduced in a controlled manner. Typically, applying pre-distortion to a reference signal degrades the ACLR; however, ACLR degradation occurs regardless when the PA 1330 operates in compression and the pre-distortion does not compensate the distortion because of peak power constraints. By introducing compression in the reference signal in a controlled manner amplitude modulation to amplitude modulation (AMAM) shaping is controlled and the amplitude modulation to phase modulation (AMPM) conversion due to PA saturation is removed. The selected compression characteristic of the reference signal thus is mainly controlled by the target ACLR and PA compression. If the PA compression exceeds a threshold value, the PA output power capability is reconfigured accordingly.

In addition, the compression controller 1360 introducing compression to the reference signal supports the DPD optimizing device 1365 when the PA 1330 is operating in compression. Specifically, by receiving and analyzing the compressed PA output signal from the feedback receiver 1355, excessive clipping of the pre-distorted signal is minimized, and often prevented. Specifically, by utilizing the DPD optimizing device 1365 in combination with the compression controller 1360, pre-distortion is applied to the reference signal in a manner that minimizes impairments resulting from a compressed PA. Therefore, memory effect is reduced compared to systems not utilizing the compression controller 1360 and DPD optimizing device 1365. Consequently, battery current consumption is minimized while still meeting industry linearity requirements.

Figure 14:
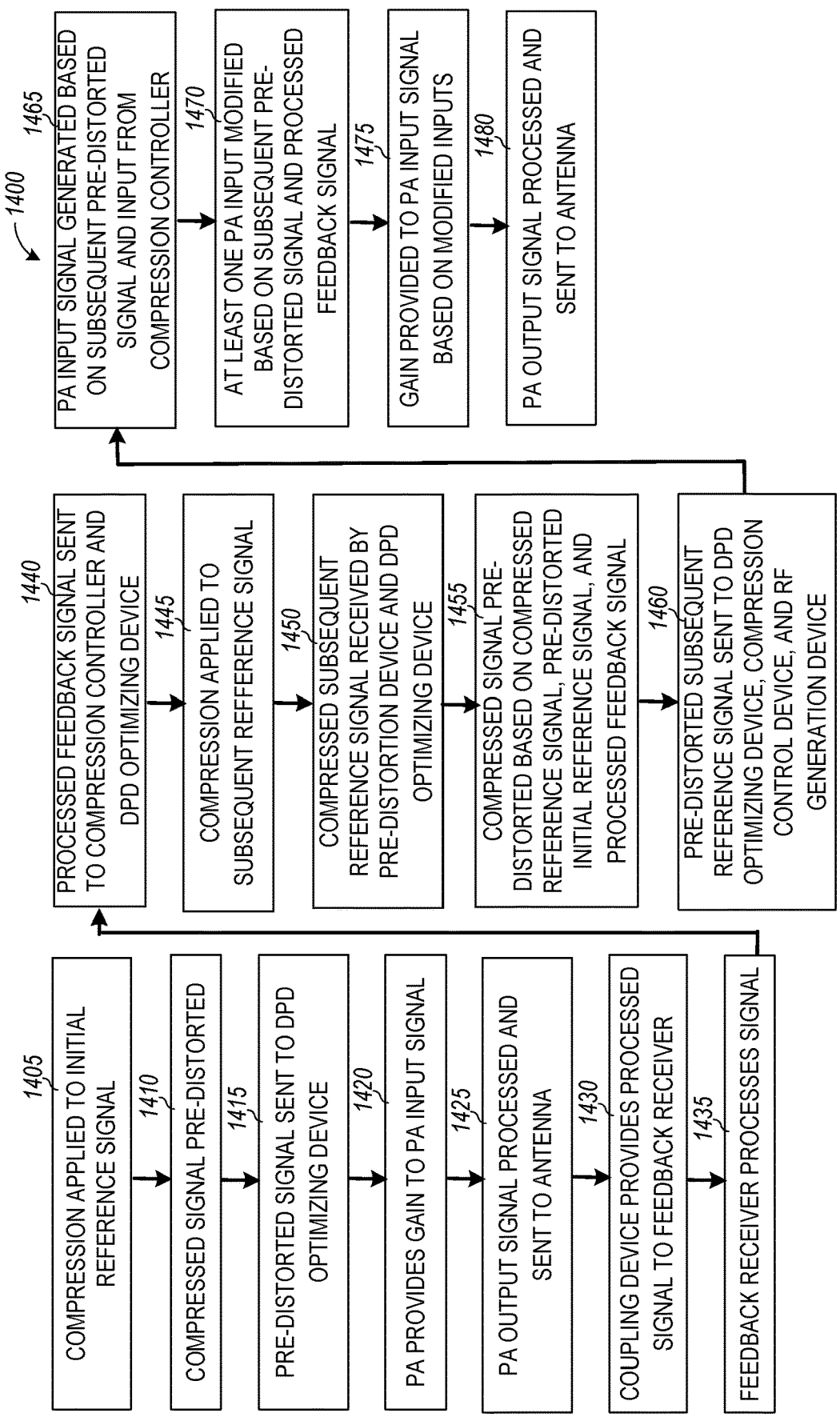
FIG. 14 illustrates a flow block diagram of a method of applying pre-distortion to a reference signal in accordance with some aspects.

FIG. 14 is a flow chart of an example method 1400 of applying pre-distortion to a reference signal, in accordance with at least one aspect described herein. At 1405, an initial reference signal is received by filtering and amplification circuitry, and is compressed by a compression device. In aspects, the filtering and amplification circuitry may be the filtering and amplification circuitry 1300 of FIG. 13, the filtering and amplification circuitry 355 of FIG. 3, or the filtering and amplification circuitry 424 of FIG. 4. At 1410, the compressed signal from the compression device is pre-distorted. At 1415, the pre-distorted signal is send to a DPD optimizing device, a compression control device and an RF generation device. At 1420, based on the pre-distorted signal, a PA provides gain to the PA input signal. At 1425, the PA output signal is processed, including up-conversion of the signal at a RFFE device and sent to an antenna for transmission.

At 1430, a coupling device of the RFFE device also provides the processed signal to a feedback receiver. At 1435, the feedback receiver processes the signal received from the RFFE device including down converting the signal, changing the signal from analog to digital, and providing BB signal conditioning. At 1440, the feedback receiver sends the processed feedback signal to the compression controller and the DPD optimizing device for analysis.

At 1445, a subsequent reference signal is received by the filtering and amplification circuitry, and the signal is compressed. The compression is applied to the subsequent reference signal by the compression device based on the pre-distorted initial signal and the processed signal sent by the feedback receiver to the compression controller. At 1450, the compressed subsequent reference signal is received by pre-distortion device and DPD optimizing device. At 1455, the DPD optimizing device pre-distorts the compressed signal based on the compressed reference signal received from the compression device, the pre-distorted initial reference signal, and the processed signal sent by the feedback receiver to the compression controller.

At 1460, the pre-distorted subsequent reference signal is sent to the DPD optimizing device, the compression control device, and the RF generation device. At 1465, the RF generation device generates a PA input signal based on the subsequent pre-distorted signal and input from the compression controller. The compression controller provides the input based on the pre-distorted subsequent reference signal and the processed signal of the initial reference signal sent by the feedback receiver.

At 1470, the compression controller modifies at least one input to the PA based on the subsequent pre-distorted signal and the processed signal of the initial reference signal sent by the feedback receiver. The input to the PA includes, but is not limited to modifying biasing current to the PA, modifying the matching network change of the PA, and/or operating a DCDC controller to modify supply voltage to the PA from a DCDC converter. The DCDC controller and converter may be of any type, including APT, ET, and the like. The compression controller, in certain aspects, may modify only one input, while in other aspects may modify two or more of these inputs.

At 1475, the PA provides gain to the PA input signal based on the inputs modified by the compression controller. At 1480, the PA output signal is processed by the RFFE device, including up-conversion of the signal and sent to the antenna for transmission.

As a result of the compression controller varying compression of a subsequent reference signal based on the pre-distorted initial signal and processed signal from the feedback receiver the subsequent reference signal supports the DPD optimizing device. Because the DPD optimizing device receives and analyzes the compressed PA output signal of the initial reference signal from the feedback receiver, excessive clipping of the pre-distorted signal is minimized, and often prevented. Specifically, by utilizing the DPD optimizing device in combination with the compression controller, pre-distortion is applied to the reference signal in a manner that minimizes impairments resulting from a compressed PA. In addition, the compression controller is also able to modify inputs to the PA to vary compression at the PA to ensure linearity of the signal is maintained at desired levels. Therefore, battery current consumption is able to be minimized while still meeting industry linearity requirements.

Figure 15:
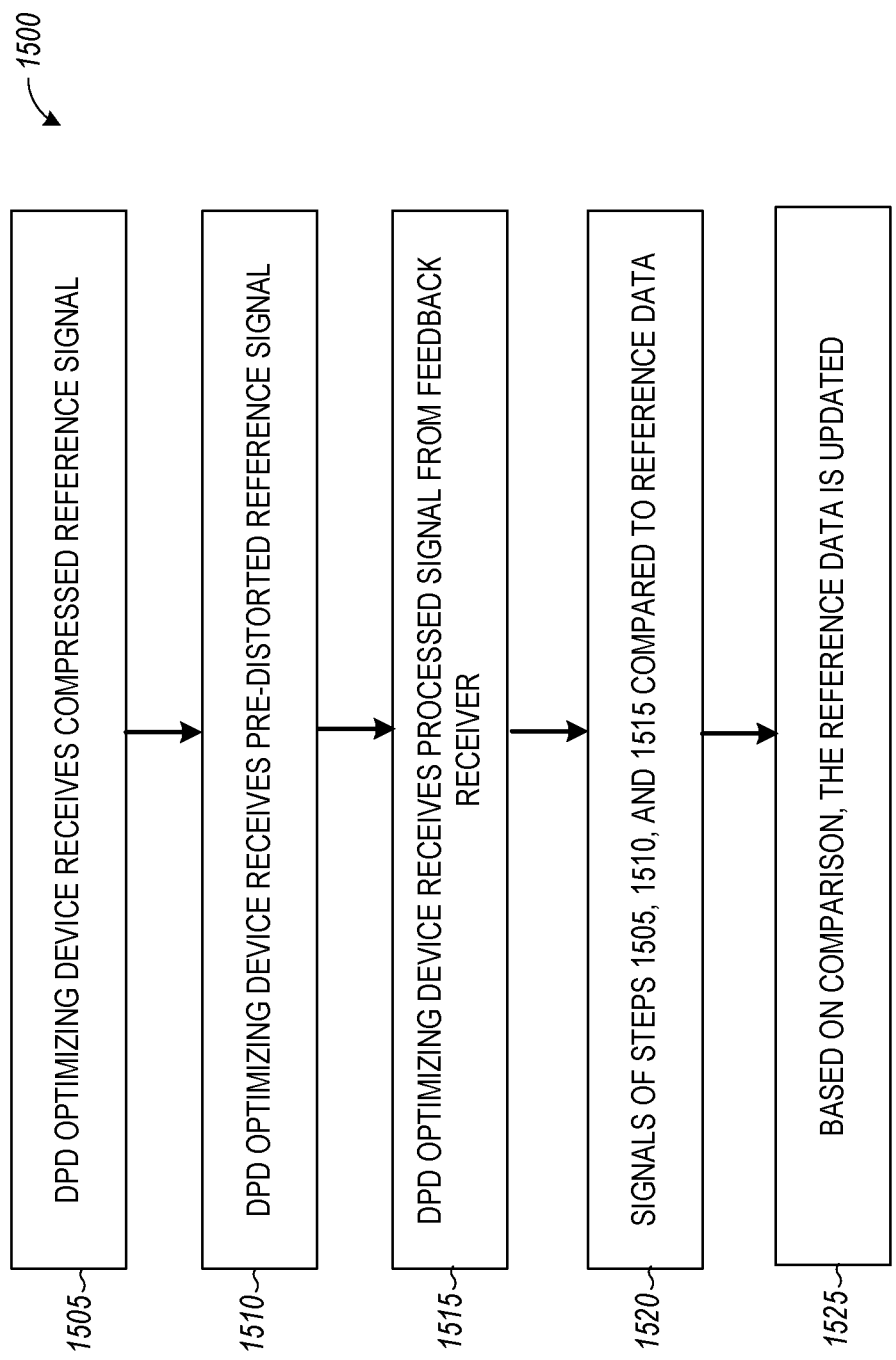
FIG. 15 illustrates a block diagram of a method of updating the DPD optimizing device in accordance with some aspects.

FIG. 15 illustrates a block diagram of a method 1500 of updating the DPD optimizing device. At 1505, the DPD optimizing device receives a compressed reference signal. At 1510, the DPD optimizing device receives a pre-distorted reference signal. At 1515, the DPD optimizing device receives a processed signal from a feedback receiver based on a previous reference signal amplified by a PA of filtering and amplification circuitry that includes the DPD optimizing device. At 1520, the signals of steps 1505, 1510, and 1515 are compared to reference data of the DPD optimizing device. Based on this comparison, the DPD optimizing device operates the DPD device in relation to subsequent reference signals. At 1525, based on the comparisons of step 1520, the reference data is updated for subsequent comparisons.

Figure 16A:
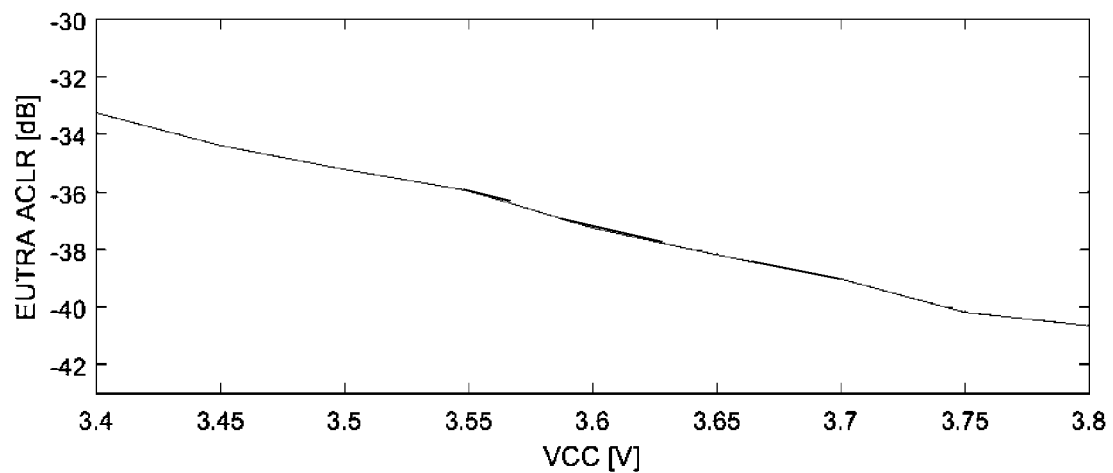
FIG. 16A illustrates a graph of ACLR vs. VCC in accordance with some aspects.
Figure 16B:
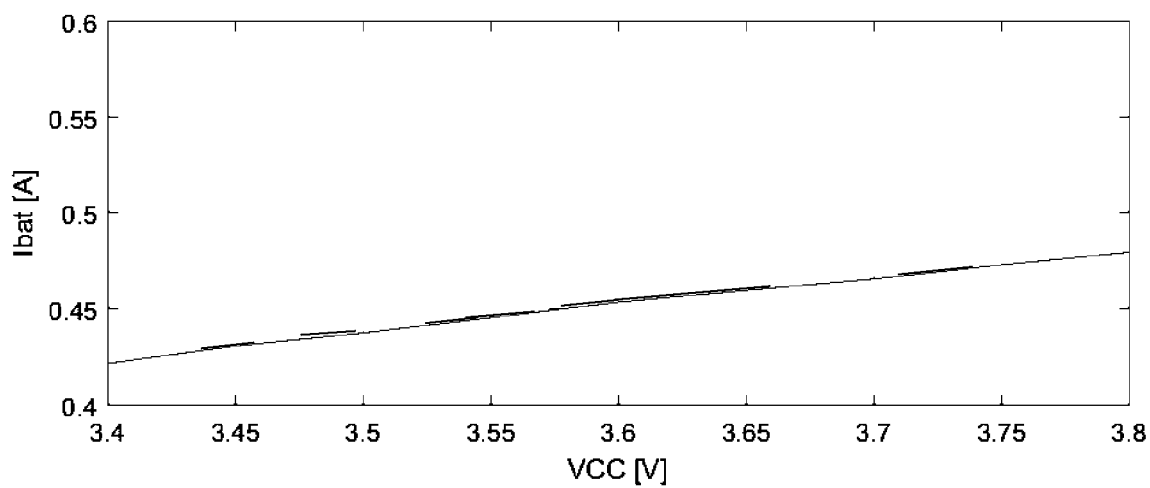
FIG. 16B illustrates a graph of battery current vs. VCC in accordance with some aspects.

FIG. 16A and FIG. 16B illustrate two plots, the ACLR versus VCC (which is equal to the PA supply voltage), and battery current versus VCC. Digital predistortion is provided utilizing the example system of FIG. 13 and method described in relation to FIGS. 14-15 to improve the baseline ACLR performance. The waveform has a bandwidth of 40 MHz and quadrature phase-shift keying (QPSK) modulation. The average power is 24 dBm. PAPR is ~8.5 dB.

Figure 17A:
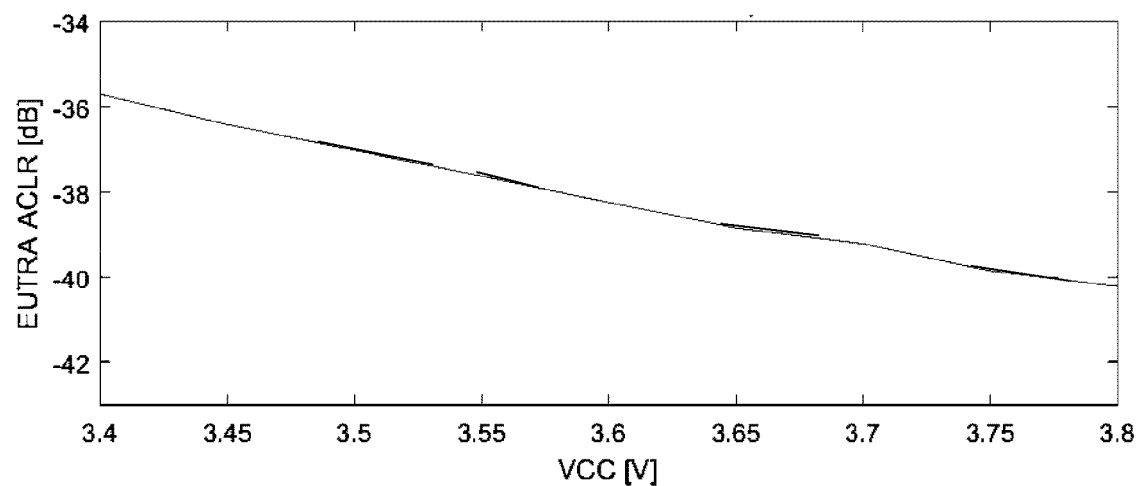
FIG. 17A illustrates a graph of ACLR vs. VCC in accordance with some aspects.
Figure 17B:
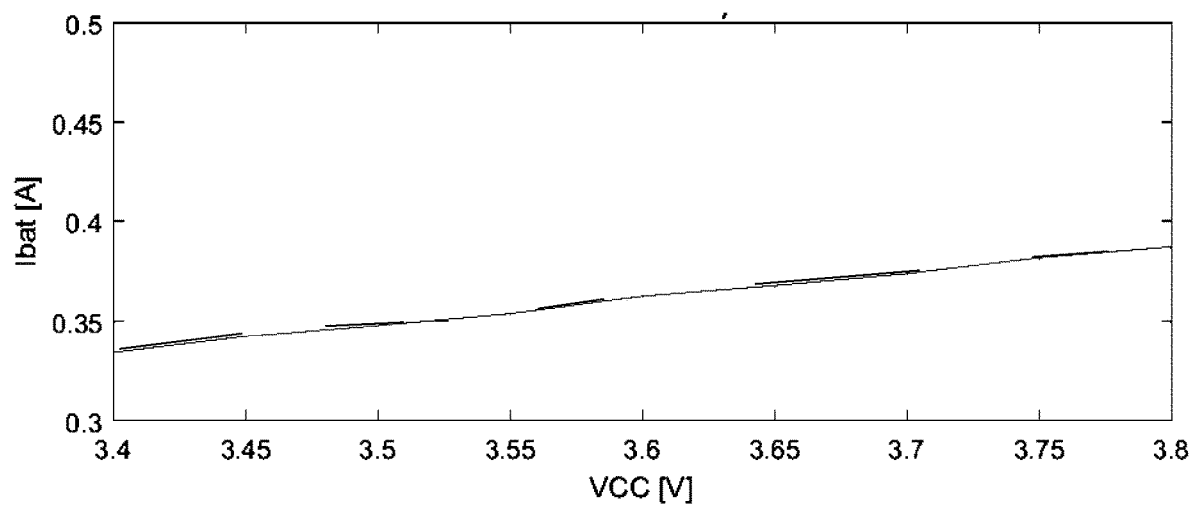
FIG. 17B illustrates a graph of battery current vs. VCC in accordance with some aspects.

FIG. 17A and FIG. 17B illustrate a signal with 40 MHz bandwidth. The average power is 22 dBm due to higher PAPR which is ~10.5 dB. Digital predistortion is provided utilizing the example system of FIG. 13 and techniques described in relation to FIGS. 14-15 to improve the baseline ACLR performance. When decreasing VCC (x-axis), the ACLR degrades as more clipping is introduced. However, at the same time, the battery current declines because the PA efficiency is increased. PA saturated power is proportional to the square of VCC, thus, by reducing VCC by 1 dB (~12%), the PA saturated power decreases by approximately 1 dB. FIGS. 16A and 16B illustrate that the ACLR degradation is approximately 7 dB per 1 dB decrease of saturated power. For the waveform of FIGS. 16A and 16B, the ACLR degradation is ~4.5 dB per 1 dB decrease of saturated power. Meanwhile, the battery current is reduced by approximately 50 mA which is approximately 12%. Thus, current is saved with only minor to no effects on linearity, keeping the circuitry within industry requirements.

By utilizing the circuitry 1300 of FIG. 13 and techniques described in connection with FIGS. 14-15, a predistortion of a PA input signal that increases its PAPR is unneeded. This prevents unwanted clipping of the transceiver TX signal resulting in significant ACLR degradation. Instead, the circuitry 1300 determines the pre-distorted signal according FIGS. 16A-16B and 17A-17B was done at high VCC where AMAM clipping is not dominant. Because the predistortion function was kept constant during the VCC sweep, the PAPR of the input signal does not increase due to higher PA compression at lower VCC.

Another problem overcome by the circuitry 1300 of FIG. 13 and techniques described in connection with FIGS. 14-15 is the increased sensitivity to load mismatch when the PA operates in compressed mode. Because clipping dominates the ACLR and EVM performance, any additional decrease of the PA saturated power causes significant ACLR degradation. In case of antenna mismatch, the saturated power of the PA may drop by a couple of dB depending on load voltage standing wave ratio (VSWR) and load phase. The circuitry and methodologies reduce and minimize ACLR degrading under these conditions while improving and maximizing EVM performance. The circuitry and methodologies also improve PA compression effects within in a mobile communication system.

In some aspects, the circuitry of FIG. 13 and techniques described in connection with FIGS. 14-15 reduce battery current by applying predistortion in a transmit system featuring a saturated amplifier. The circuitry of FIG. 13 and methodologies of FIGS. 14-15 mitigate the effects of PA saturation on ACLR and EVM performance resulting in increased talk time (or operation time for data applications) while maintaining quality of service targets.

Figure 18:
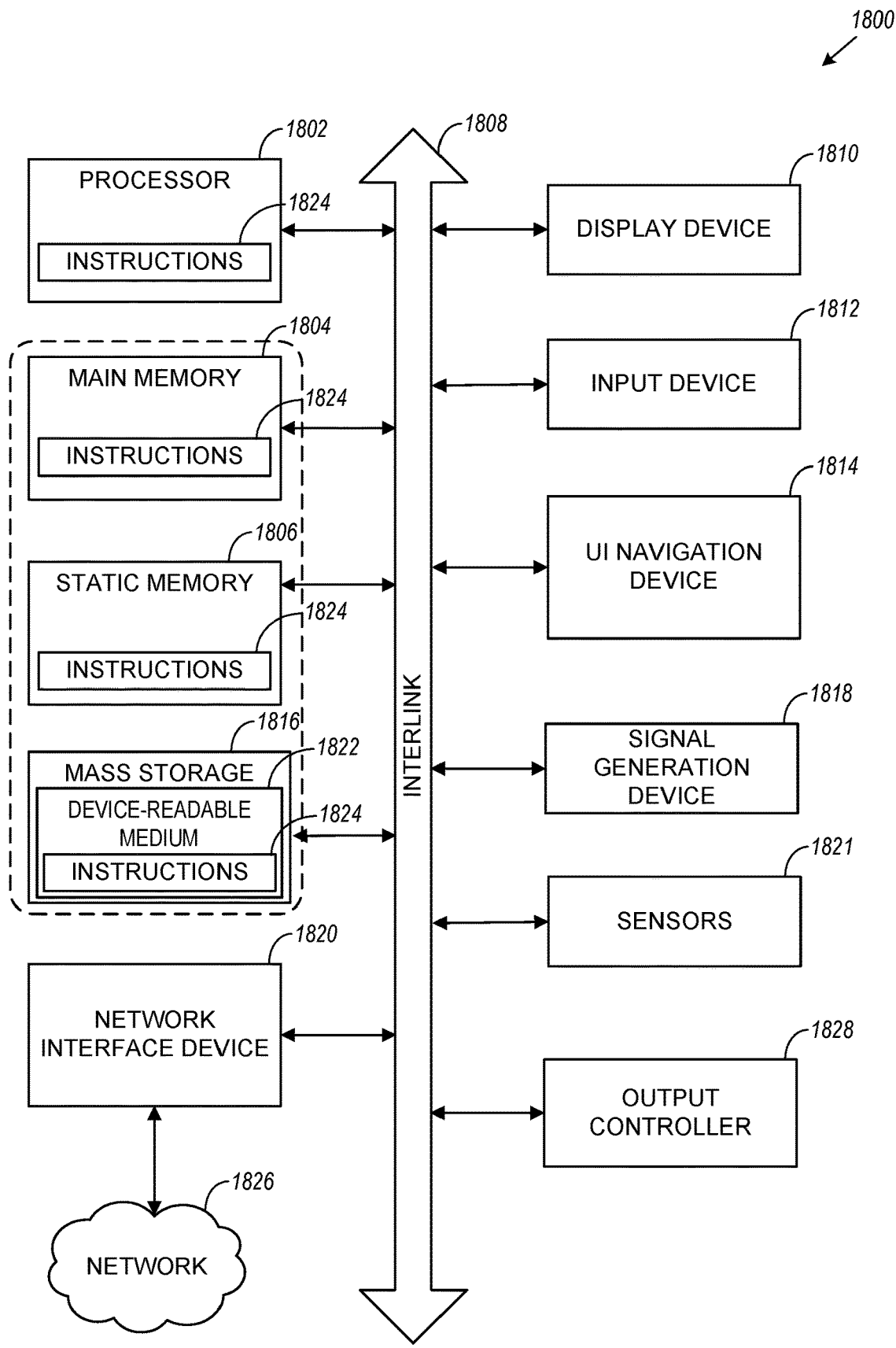
FIG. 18 illustrates a machine that in aspects is utilized to implement the methods described in accordance with some aspects.

FIG. 18 shows a machine that in aspects is utilized to implement the methods described herein. Such machines may include devices used by the DPD optimizing device, compression controller, DCDC controller, or the like to make comparisons, determinations, calculations, and the like described herein. The machine (e.g., computer system) 1800 may include a hardware processor 1802 (e.g., a central processing unit (CPU), a graphics processing unit (GPU), a hardware processor core, or any combination thereof), a main memory 1804 and a static memory 1806, some or all of which may communicate with each other via an interlink (e.g., bus) 1808. The machine 1800 may further include a display unit 1810, an alphanumeric input device 1812 (e.g., a keyboard), and a user interface (UI) navigation device 1814 (e.g., a mouse). In an aspect, the display unit 1810, input device 1812 and UI navigation device 1814 may be a touch screen display. The machine 1800 may additionally include a storage device (e.g., drive unit) 1816, a signal generation device 1818 (e.g., a speaker), a network interface device 1820, and one or more sensors 1821, such as a global positioning system (GPS) sensor, compass, accelerometer, or other sensor. The machine 1800 may include an output controller 1828, such as a serial (e.g., universal serial bus (USB)), parallel, or other wired or wireless (e.g., infrared (IR), near field communication (NFC), etc.) connection to communicate or control one or more peripheral devices (e.g., a printer, card reader, etc.).

The storage device 1816 may include a machine readable medium 1822 on which is stored one or more sets of data structures or instructions 1824 (e.g., software) embodying or utilized by any one or more of the techniques or functions described herein. The instructions 1824 may also reside, completely or at least partially, within the main memory 1804, within static memory 1806, or within the hardware processor 1802 during execution thereof by the machine 1800. In an aspect, one or any combination of the hardware processor 1802, the main memory 1804, the static memory 1806, or the storage device 1816 may constitute machine readable media. In some aspects, the machine readable medium may be or may include a non-transitory computer-readable storage medium. In some aspects, the machine readable medium may be or may include a computer-readable storage medium.

While the machine readable medium 1822 is illustrated as a single medium, the term "machine readable medium" may include a single medium or multiple media (e.g., a centralized or distributed database, and/or associated caches and servers) configured to store the one or more instructions 1824. The term "machine readable medium" may include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some aspects, machine readable media may include non-transitory machine readable media. In some aspects, machine readable media may include machine readable media that is not a transitory propagating signal.

The instructions 1824 may further be transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an aspect, the network interface device 1820 may include one or more physical jacks (e.g., Ethernet, coaxial, or phone jacks) or one or more antennas to connect to the communications network 1826. In an aspect, the network interface device 1820 may include a plurality of antennas to wirelessly communicate using at least one of single-input multiple-output (SIMO), multiple-input multiple-output (MIMO), or multiple-input single-output (MISO) techniques. In some aspects, the network interface device 1820 may wirelessly communicate using Multiple User MIMO techniques. The term "transmission medium" shall be taken to include any intangible medium that is capable of storing, encoding or carrying instructions for execution by the machine 1800, and includes digital or analog communications signals or other intangible medium to facilitate communication of such software.

VARIOUS NOTES & ASPECTS

Example 1 is an apparatus for a mobile communication device adapted for digital pre-distortion (DPD), the apparatus comprising: a memory; a processor operatively coupled to the memory, the processor to: receive a first input signal; receive a first output signal from a power amplifier (PA) based on the first input signal; vary compression applied to a second input signal based on the first output signal of the PA; generate a distortion compensation vector for the second input signal based on the first output signal of the PA; and vary an input excitation signal supplied to the PA based on the first output signal of the PA.

In Example 2, the subject matter of Example 1 optionally includes wherein the processor is configured to: receive the first input signal at a crest factor reduction system; and compress the first input signal within the crest factor reduction system to reduce a peak-to-average ratio (PAR) of the first input signal.

In Example 3, the subject matter of Example 2 optionally includes wherein the crest factor reduction system includes at least a first crest factor reduction subsystem and a second crest factor reduction subsystem, and wherein the first input signal is separated into at least a first input signal component and a second input signal component such that the first input signal component is received by the first crest factor reduction subsystem and the second input signal component is received by the second crest factor subsystem.

In Example 4, the subject matter of Example 3 optionally includes wherein the first and second crest factor subsystems each includes an error detection system, comprising: a comparator configured to compare the first input signal with a compressed signal to generate an error signal indicating distortion between the first input signal and the compressed signal; an in-band filter configured to filter the error signal based on an in-band frequency range to generate an in-band error signal indicating in-band distortion of the compressed signal with respect to the first input signal from which the compressed signal is generated; and an out-of-band filter configured to filter the error signal based on an out-of-band frequency range to generate an out-of-band error signal indicating out-of-band distortion of the compressed signal with respect to the first input signal; an in-band gain circuit configured to apply an in-band gain to the in-band error signal to generate an adjusted in-band error signal; an out-of-band gain circuit configured to apply an out-of-band gain to the out-of-band error signal to generate an adjusted out-of-band error signal; and a combining system configured to combine the compressed signal with the adjusted in-band error signal and the adjusted out-of-band error signal to generate an output signal, the combining system configured to combine the compressed signal with the adjusted in-band error signal and the adjusted out-of-band error signal, the in-band gain circuit configured to apply the in-band gain based on the output signal, and the out-of-band gain circuit configured to apply the out-of-band gain based on the output signal such that distortion of the output signal is reduced with respect to distortion of the compressed signal.

In Example 5, the subject matter of Example 4 optionally includes wherein the crest factor reduction system further comprises a shared adaptation system configured to receive the output signal of each of the first and second crest factor subsystems and determine out-of-band distortion of each output signal.

In Example 6, the subject matter of Example 5 optionally includes wherein the shared adaptation system is configured to determine in-band distortion of the output signal of each of the first and second crest factor subsystems based on mask of the output signal of each of the first and second crest factor subsystems with respect to the first input signal and configured to adjust the in-band gain, the out-of-band gain, or both the in-band gain and the out-of-band gain based on the mask.

In Example 7, the subject matter of Example 6 optionally includes wherein the shared adaptation system configured to determine in-band distortion of the output signal of each of the first and second crest factor subsystems based on an error vector magnitude (EVM) of the output signal of each of the first and second crest factor subsystems with respect to the first input signal and configured to adjust the in-band gain, the out-of-band gain, or both the in-band gain and the out-of-band gain based on the EVM and mask.

In Example 8, the subject matter of Example 7 optionally includes the shared adaptation circuitry configured to determine out-of-band distortion of the output signal of each of the first and second crest factor subsystems based on an adjacent channel leakage ratio (ACLR) of the output signal of each of the first and second crest factor subsystems and configured to adjust the in-band gain, the out-of-band gain, or both the in-band gain and the out-of-band gain based on the ACLR, EVM, and mask.

In Example 9, the subject matter of any one or more of Examples 5-8 optionally include wherein the crest factor reduction system further comprises a multiplexing device that combines the output signal of the first crest factor subsystem with the output signal of the second crest factor subsystem to form a composite crest factor reduction signal.

In Example 10, the subject matter of any one or more of Examples 2-9 optionally include wherein the processor is configured to: update the distortion compensation vector based on the first output signal; and modify the first input signal compressed within the crest factor reduction system based on the updated distortion compensation vector.

In Example 11, the subject matter of Example 10 optionally includes wherein updating the distortion compensation vector comprises scaling a sequence of input samples to generate a sequence of output samples for input to the PA; and generate the distortion compensation vector based on vector outputs of predetermined distortion compensation functions; wherein a sample of the input samples is based on the first input signal.

In Example 12, the subject matter of Example 11 optionally includes wherein the processor is configured to: generate per-sample scale factors to scale the sequence of input samples, the per-sample scale factors based on per-sample inner products between a common weight vector and the per-sample distortion compensation vectors, the per-sample scale factors to compensate for distortion of the PA; and update the common weight vector based on a distortion error sequence between the sequence of output samples and a sequence of feedback samples generated from the first output signal of the PA.

In Example 13, the subject matter of any one or more of Examples 1-12 optionally include the input excitation signal supplied to the PA is one of voltage or biasing current.

In Example 14, the subject matter of any one or more of Examples 1-13 optionally include wherein the processor is configured to: generate the distortion compensation vector based on a predetermined distortion compensation coefficient for input to the PA; compare the determined distortion compensation vector to a reference distortion compensation vector; and update the predetermined distortion compensation coefficient based on the comparison between the determined distortion compensation vector and the reference distortion compensation vector.

Example 15 is an apparatus for a mobile communication device adapted for digital pre-distortion (DPD), the apparatus comprising: a memory; a processor operatively coupled to the memory the processor to: receive a reference signal; receive an output signal from a digital pre-distortion device based on the reference signal; generate a distortion compensation vector based on the output signal received from the digital pre-distortion device; and vary an input to a power amplifier (PA) based on the distortion compensation vector.

Example 16 is an apparatus according to Example 15, wherein the processor is configured to: receive an output signal from the (PA) that receives the output signal from the digital pre-distortion device; generate the distortion compensation vector based on the output signal from the PA.

Example 17 is an apparatus according to Example 15, wherein the reference signal is a first reference signal, and wherein the processor is configured to: vary compression of a second reference signal based on the distortion compensation vector generated based on the first reference signal.

Example 18 is an apparatus according to Example 15, wherein the input to the PA is at least one of PA supply voltage, PA biasing current, or PA matching circuitry input.

In Example 19, the subject matter of any one or more of Examples 15-18 optionally include wherein the processor is configured to: compare the output signal from the digital pre-distortion device to a reference pre-distortion output signal; and generate the distortion compensation vector based on the reference pre-distortion output signal.

In Example 20, the subject matter of Example 19 optionally includes the wherein the processor is configured to: update the reference pre-distortion output signal based on the output signal from the digital pre-distortion device.

Example 21 is a method of generating an output signal from a power amplifier (PA), the method comprising: sampling a first output signal of the PA for output signal data; reducing a peak-to-average ratio of an input signal based on the output signal data; pre-distorting the input signal after reducing the peak-to-average ratio; varying compression of the PA before receiving the pre-distorted input signal based on the output signal data; generating a second output signal of the PA after varying compression of the PA.

In Example 22, the subject matter of Example 21 optionally includes wherein the peak-to-average ratio is reduced with a crest factor reduction system.

In Example 23, the subject matter of any one or more of Examples 21-22 optionally include wherein pre-distorting the input signal comprises updating a distortion compensation vector based on an output signal received from a digital pre-distortion device.

In Example 24, the subject matter of any one or more of Examples 21-23 optionally include wherein pre-distorting the input signal comprises utilizing a weighted function to determine the pre-distortion.

In Example 25, the subject matter of any one or more of Examples 21-24 optionally include wherein the compression of the PA is varied by varying the supply voltage of the PA.

Each of these non-limiting examples may stand on its own, or may be combined in various permutations or combinations with one or more of the other examples.

The above detailed description includes references to the accompanying drawings, which form a part of the detailed description. The drawings show, by way of illustration, specific aspects in which the invention may be practiced. These aspects are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other aspects may be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed aspect. Thus, the following claims are hereby incorporated into the Detailed Description as examples or aspects, with each claim standing on its own as a separate aspect, and it is contemplated that such aspects may be combined with each other in various combinations or permutations. The scope of the invention should be determined with reference to the appended claims, along with the full scope of equivalents to which such claims are entitled.

What is claimed:

1. An apparatus for a mobile communication device adapted for digital pre-distortion (DPD), the apparatus comprising:
a memory;
a processor operatively coupled to the memory the processor to:
receive a first input signal;
receive a first output signal from a power amplifier (PA) based on the first input signal;
vary compression applied to a second input signal, prior to DPD, based on the first output signal of the PA;
generate a distortion compensation vector for the second input signal based on the first output signal of the PA; and
vary an input excitation signal supplied to the PA to vary compression of the PA based on the first output signal of the PA,
wherein the processor is configured to coordinate the variation of the compression applied to the second input signal with the variation of the compression of the PA based at least in part on an Adjacent Channel Leakage Ratio (ACLR).

2. The apparatus according to claim 1, wherein the processor is configured to:
receive the first input signal at a crest factor reduction system; and
compress the first input signal within the crest factor reduction system to reduce a peak-to-average ratio (PAR) of the first input signal.

3. The apparatus according to claim 2, wherein the processor is configured to:
update the distortion compensation vector based on the first output signal; and
modify the first input signal compressed within the crest factor reduction system based on the updated distortion compensation vector.

4. The apparatus according to claim 3, wherein updating the distortion compensation vector comprises:
scaling a sequence of input samples to generate a sequence of output samples for input to the PA; and
generating the distortion compensation vector based on vector outputs of predetermined distortion compensation functions;
wherein a sample of the input samples is based on the first input signal.

5. The apparatus according to claim 4, wherein the processor is configured to:
generate per-sample scale factors to scale the sequence of input samples, the per-sample scale factors based on per-sample inner products between a common weight vector and the per-sample distortion compensation vectors, the per-sample scale factors to compensate for distortion of the PA; and
update the common weight vector based on a distortion error sequence between the sequence of output samples and a sequence of feedback samples generated from the first output signal of the PA.

6. The apparatus according to claim 1, wherein the input excitation signal supplied to the PA is one of voltage or biasing current.

7. An apparatus for a mobile communication device adapted for digital pre-distortion (DPD), the apparatus comprising:
a memory;
a processor operatively coupled to the memory the processor to:
receive a first input signal;
receive a first output signal from a power amplifier (PA) based on the first input signal;
vary compression applied to a second input signal based on the first output signal of the PA;
generate a distortion compensation vector for the second input signal based on the first output signal of the PA; and
vary an input excitation signal supplied to the PA based on the first output signal of the PA, wherein the processor is configured to:
receive the first input signal at a crest factor reduction system; and
compress the first input signal within the crest factor reduction system to reduce a peak-to-average ratio (PAR) of the first input signal, and
wherein the crest factor reduction system includes at least a first crest factor reduction subsystem and a second crest factor reduction subsystem, and wherein the first input signal is separated into at least a first input signal component and a second input signal component such that the first input signal component is received by the first crest factor reduction subsystem and the second input signal component is received by the second crest factor subsystem.

8. The apparatus according to claim 7, wherein the first and second crest factor subsystems each includes an error detection system, the error detection system comprising:
a comparator configured to compare the first input signal with a compressed signal to generate an error signal indicating distortion between the first input signal and the compressed signal;
an in-band filter configured to filter the error signal based on an in-band frequency range to generate an in-band error signal indicating in-band distortion of the compressed signal with respect to the first input signal from which the compressed signal is generated;
an out-of-band filter configured to filter the error signal based on an out-of-band frequency range to generate an out-of-band error signal indicating out-of-band distortion of the compressed signal with respect to the first input signal;
an in-band gain circuit configured to apply an in-band gain to the in-band error signal to generate an adjusted in-band error signal;
an out-of-band gain circuit configured to apply an out-of-band gain to the out-of-band error signal to generate an adjusted out-of-band error signal; and
a combining system configured to combine the compressed signal with the adjusted in-band error signal and the adjusted out-of-band error signal to generate an output signal, the combining system configured to combine the compressed signal with the adjusted in-band error signal and the adjusted out-of-band error signal, the in-band gain circuit configured to apply the in-band gain based on the output signal, and the out-of-band gain circuit configured to apply the out-of-band gain based on the output signal such that distortion of the output signal is reduced with respect to distortion of the compressed signal.

9. The apparatus according to claim 8, wherein the crest factor reduction system further comprises a shared adaptation system configured to receive the output signal of each of the first and second crest factor subsystems and determine out-of-band distortion of each output signal.

10. The apparatus according to claim 9, wherein the shared adaptation system is configured to determine in-band distortion of the output signal of each of the first and second crest factor subsystems based on transmitted spectral mask of the output signal of each of the first and second crest factor subsystems with respect to the first input signal, and configured to adjust the in-band gain, the out-of-band gain, or both the in-band gain and the out-of-band gain based on the transmitted spectral mask.

11. The apparatus according to claim 10, wherein the shared adaptation system is configured to determine in-band distortion of the output signal of each of the first and second crest factor subsystems based on an error vector magnitude (EVM) of the output signal of each of the first and second crest factor subsystems with respect to the first input signal and configured to adjust the in-band gain, the out-of-band gain, or both the in-band gain and the out-of-band gain based on the EVM and transmitted spectral mask.

12. The apparatus according to claim 11, further comprising the shared adaptation circuitry configured to determine out-of-band distortion of the output signal of each of the first and second crest factor subsystems based on an adjacent channel leakage ratio (ACLR) of the output signal of each of the first and second crest factor subsystems and configured to adjust the in-band gain, the out-of-band gain, or both the in-band gain and the out-of-band gain based on the ACLR, EVM, and transmitted spectral mask.

13. The apparatus according to claim 9, wherein the crest factor reduction system further comprises a multiplexing device that combines the output signal of the first crest factor subsystem with the output signal of the second crest factor subsystem to form a composite crest factor reduction signal.

14. An apparatus for a mobile communication device adapted for digital pre-distortion (DPD), the apparatus comprising:
a memory;
a processor operatively coupled to the memory the processor to:
receive a first input signal;
receive a first output signal from a power amplifier (PA) based on the first input signal;
vary compression applied to a second input signal based on the first output signal of the PA;
generate a distortion compensation vector for the second input signal based on the first output signal of the PA; and
vary an input excitation signal supplied to the PA based on the first output signal of the PA, wherein the processor is configured to:
generate the distortion compensation vector based on a predetermined distortion compensation coefficient for input to the PA;
compare the determined distortion compensation vector to a reference distortion compensation vector; and
update the predetermined distortion compensation coefficient based on the comparison between the determined distortion compensation vector and the reference distortion compensation vector.

* * * * *